US012143803B2

(12) United States Patent
Nagasaka

(10) Patent No.: US 12,143,803 B2
(45) Date of Patent: Nov. 12, 2024

(54) INFORMATION PROCESSING DEVICE, INFORMATION PROCESSING METHOD, AND INFORMATION PROCESSING SYSTEM

(71) Applicant: SONY GROUP CORPORATION, Tokyo (JP)

(72) Inventor: Hideo Nagasaka, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 154 days.

(21) Appl. No.: 17/759,865

(22) PCT Filed: Jan. 18, 2021

(86) PCT No.: PCT/JP2021/001406

§ 371 (c)(1),
(2) Date: Aug. 1, 2022

(87) PCT Pub. No.: WO2021/161722

PCT Pub. Date: Aug. 19, 2021

(65) Prior Publication Data

US 2023/0118803 A1 Apr. 20, 2023

(30) Foreign Application Priority Data

Feb. 10, 2020 (JP) ................................. 2020-020560

(51) Int. Cl.
*H04S 7/00* (2006.01)

(52) U.S. Cl.
CPC .......... *H04S 7/302* (2013.01); *H04S 2420/01* (2013.01)

(58) Field of Classification Search
CPC ..... G06F 16/683; G06F 16/68; G06F 3/04847
(Continued)

(56) References Cited

U.S. PATENT DOCUMENTS 11,290,837 B1 * 3/2022 Brimijoin, II .......... H04S 7/304
2015/0189457 A1 * 7/2015 Donaldson .............. H04M 3/56 381/1

(Continued)

FOREIGN PATENT DOCUMENTS

JP 11-331992 A 11/1999
JP 2002-044797 A 2/2002

(Continued)

OTHER PUBLICATIONS

International Search Report and Written Opinion of PCT Application No. PCT/JP2021/001406, issued on Mar. 30, 2021, 09 pages of ISRWO.

*Primary Examiner* — Alexander Krzystan
(74) *Attorney, Agent, or Firm* — CHIP LAW GROUP

(57) ABSTRACT

The information processing device includes an acquisition unit, a determination unit, and a signal processing unit. The acquisition unit acquires one or a plurality of other sound elements. The determination unit determines importance levels of the sound elements acquired by the acquisition unit. The signal processing unit changes a sound source position of at least one of a sound element of a content being reproduced or another sound element according to the importance levels of the sound elements determined by the determination unit. Consequently, even in a case where the sound element of the reproduced content and the another sound element are simultaneously generated, sound interference between the sound element of the reproduced content and the another sound element can be suppressed.

16 Claims, 11 Drawing Sheets

(58) Field of Classification Search
USPC .............................................. 381/303; 700/94
See application file for complete search history.

(56) References Cited

U.S. PATENT DOCUMENTS

| | | | | |
|---|---|---|---|---|
| 2016/0104491 | A1* | 4/2016 | Lee | G10L 19/008 381/22 |
| 2018/0146289 | A1 | 5/2018 | Namm | |
| 2018/0359592 | A1* | 12/2018 | Laaksonen | H04S 3/008 |
| 2023/0093585 | A1* | 3/2023 | Faundez Hoffmann | G10L 25/18 704/200 |

FOREIGN PATENT DOCUMENTS

| | | | |
|---|---|---|---|
| JP | 2006-115364 | A | 4/2006 |
| JP | 2007-036610 | A | 2/2007 |
| WO | 2016/009850 | A1 | 1/2016 |

* cited by examiner

26

| IMPORTANCE LEVEL (261) | SOUND ELEMENT TYPE (262) |
|---|---|
| IMPORTANCE LEVEL 1 | ALARM, FIXED TELEPHONE SOUND |
| IMPORTANCE LEVEL 2 | DIALOG |
| IMPORTANCE LEVEL 3 | REPRODUCED CONTENT |

26A

| IMPORTANCE LEVEL (261A) | SOUND TYPE CATEGORY (262A) | SOUND ELEMENT TYPE (263A) |
|---|---|---|
| IMPORTANCE LEVEL 1 | EXTERNAL SOUND | BABY'S CRY, VOICE OF MR. A, TELEPHONE SOUND |
| | SYSTEM SOUND | ALARM SOUND, FIXED TELEPHONE SOUND |
| IMPORTANCE LEVEL 2 | SYSTEM SOUND | CONTENT BEING REPRODUCED |
| IMPORTANCE LEVEL 3 | EXTERNAL SOUND | VOICE OF PERSON OTHER THAN MR. A, CAR SOUND |

FIG. 10

26B

| SPACE TYPE | | HOME | OUTSIDE HOME |
|---|---|---|---|
| IMPORTANCE LEVEL | SOUND TYPE CATEGORY | SOUND ELEMENT TYPE | SOUND ELEMENT TYPE |
| IMPORTANCE LEVEL 1 | EXTERNAL SOUND | BABY'S CRY, VOICE OF MR. A, TELEPHONE SOUND | BABY'S CRY, VOICE OF MR. A, TELEPHONE SOUND, CAR SOUND |
| | SYSTEM SOUND | ALARM SOUND, FIXED TELEPHONE SOUND | ALARM SOUND |
| IMPORTANCE LEVEL 2 | SYSTEM SOUND | CONTENT BEING REPRODUCED | CONTENT BEING REPRODUCED |
| IMPORTANCE LEVEL 3 | EXTERNAL SOUND | VOICE OF PERSON OTHER THAN MR. A, CAR SOUND | VOICE OF PERSON OTHER THAN MR. A, TELEPHONE SOUND |

AT TIME OF SOUND SOURCE POSITION ESTIMATION

AT TIME OF SOUND SOURCE POSITION SETTING

○ REPRODUCED CONTENT

⊘ CAR SOUND

AT TIME OF SOUND SOURCE POSITION ESTIMATION

AT TIME OF SOUND SOURCE POSITION SETTING

○ REPRODUCED CONTENT

⊘ VOICE OF MR. A

⊗ VOICE OF MR. B

INFORMATION PROCESSING DEVICE, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2021/001406 filed on Jan. 18, 2021, which claims priority benefit of Japanese Patent Application No. JP 2020-020560 filed in the Japan Patent Office on Feb. 10, 2020. Each of the above-referenced applications is hereby incorporated herein by reference in its entirety.

TECHNICAL FIELD

The present disclosure relates to an information processing device or the like having a function capable of changing a sound source position of a sound element.

BACKGROUND ART

In recent years, an information processing device such as a virtual assistant has been known as a software agent that executes a task or service for an individual. The information processing device includes, for example, a function of reproducing a content, a function of performing an alarm notification, a dialog function in which artificial intelligence (AI) interacts with a user, and the like. The information processing device is connected to headphones or the like worn by the user, and outputs, for example, a reproduced content of music, a moving image, or the like, and a sound signal for an alarm, a dialog, or the like from the headphones. Consequently, the user can receive various services while listening to the sound from the headphones.

For example, in a case where the dialog and the reproduced content are simultaneously generated, the information processing device localizes the sound source position of the dialog and the sound source position of the reproduced content to the same inside head by the headphones. In this case, since the dialog and the reproduced content overlap and sound interference occurs between the dialog and the reproduced content, it becomes difficult for the user to listen to the dialog and the reproduced content. Therefore, in the information processing device, content reproduction is stopped while a dialog is being generated. Furthermore, in the information processing device, a technology for enabling the sound source position of a sound element to be changed using headphones is widely known.

CITATION LIST

Patent Document

Patent Document 1: Japanese Patent Application Laid-Open No. 11-331992
Patent Document 2: Japanese Patent Application Laid-Open No. 2002-44797

SUMMARY OF THE INVENTION

Problems to be Solved by the Invention

However, in the information processing device, for example, if the content reproduction is stopped in a case where another sound element of a dialog or the like is generated during the content reproduction, sound of the reproduced content is interrupted, and thus there is a risk of giving discomfort to the user.

Therefore, in order to cope with such a situation, for example, there is a demand for a technology for suppressing, even in a case where another sound element is simultaneously generated during content reproduction, sound interference between the reproduced content and the other sound element by changing a sound source position where the other sound element is heard or a sound source position where the reproduced content is heard. Furthermore, while there is a technology of localizing a sound image by each input sound signal to the outside head in order to change the sound source position as a headphone device, there is no technology of controlling the sound image localization position of the input sound signal, which needs to be reported according to the user, and there is a demand for this technology.

Therefore, the present disclosure proposes an information processing device and the like capable of suppressing sound interference between a sound element of a reproduced content and another sound element even in a case where the sound element of the reproduced content and the another sound element are simultaneously generated.

Solutions to Problems

In order to solve the above-described problem, an information processing device according to an aspect of the present disclosure includes an acquisition unit that acquires a sound element of a content being reproduced and one or a plurality of other sound elements, a determination unit that determines importance levels of the sound elements acquired by the acquisition unit, and a signal processing unit that changes a sound source position of either the sound element of the content being reproduced or the other sound element according to the importance levels of the sound elements determined by the determination unit.

BRIEF DESCRIPTION OF DRAWINGS

FIG. 10 is a diagram illustrating an example of an importance level table in an information processing device.

MODE FOR CARRYING OUT THE INVENTION

Figure 1:
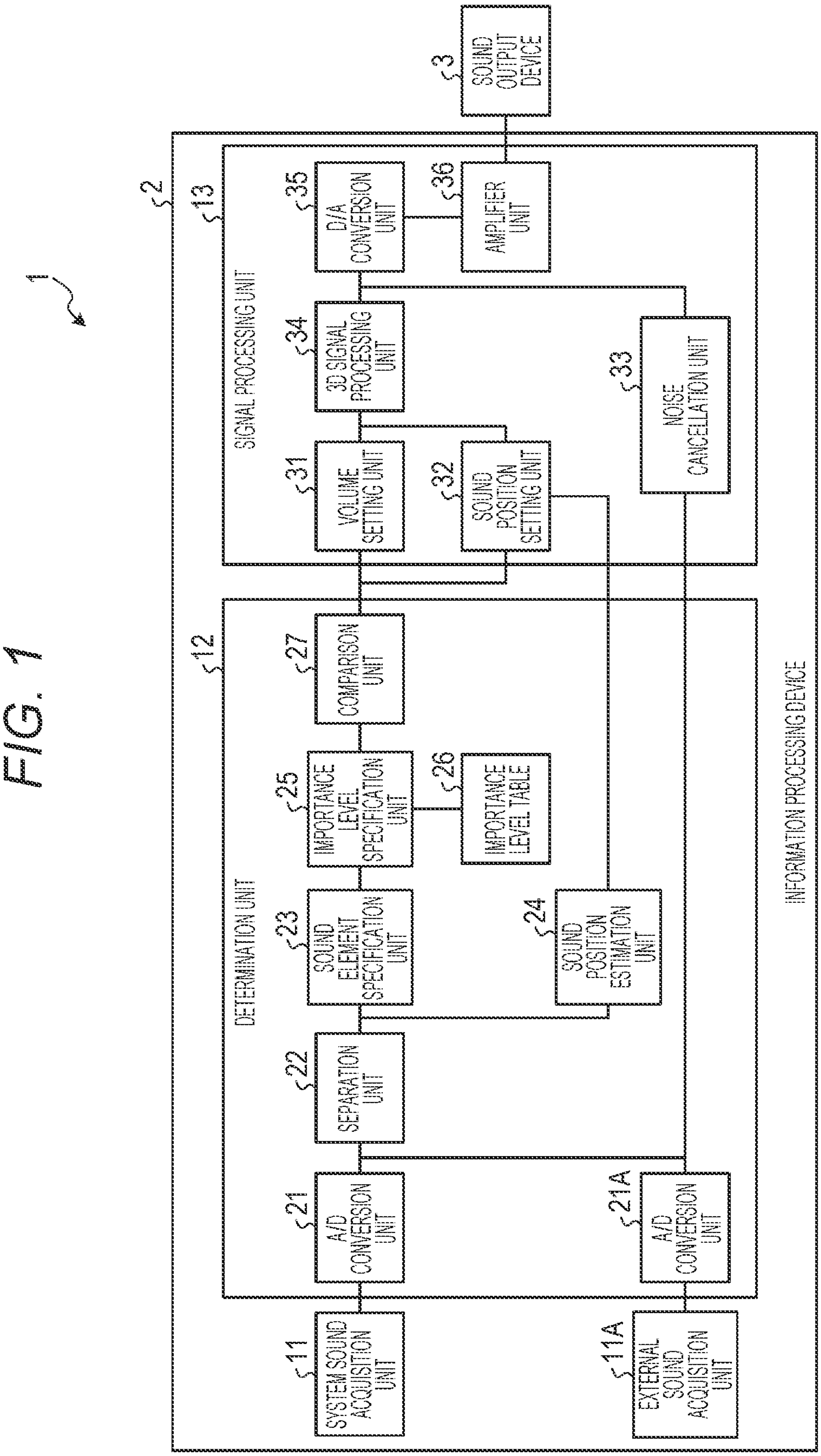
FIG. 1 is a diagram illustrating an example of an information processing system according to a first embodiment of the present disclosure.

Hereinafter, embodiments of the present disclosure will be described in detail on the basis of the drawings. Note that in each of the following embodiments, the same parts are denoted by the same reference numerals, and redundant description will be omitted.

Furthermore, the present disclosure will be described according to the following order of items.

1. Introduction
1-1. Outline of information processing system
2. Configuration and operation of information processing system of first embodiment
2-1. Configuration of information processing device
2-2. Configuration of determination unit
2-3. Configuration of signal processing unit
2-4. Configuration of importance level table
2-5. Example of sound source position
2-6. First 3D signal generating process
3. Configuration and operation of information processing system of second embodiment
3-1. Configuration of information processing device
3-2. Configuration of importance level table
3-3. Example of sound source position
3-4. Second 3D signal generating process
4. Configuration and operation of information processing system of third embodiment
4-1. Configuration of information processing device
4-2. Configuration of importance level table
4-3. Example of sound source position
4-4. Third 3D signal generating process
4-5. Example of operation of information processing device
5. Modification Example
6. Conclusion

1. Introduction

<1-1. Outline of Information Processing System>

An information processing device includes, for example, a function of a reproducing content, a function of performing an alarm notification, a dialog function in which AI interacts with a user, and the like. The information processing device is connected to headphones or the like worn by the user, and outputs, for example, a reproduced content of music, a moving image, or the like, and a sound signal for an alarm, a dialog, or the like from the headphones. Consequently, the user can receive various services while listening to the sound from the headphones.

However, for example, in a case where a dialog occurs while a reproduced content is being output by the headphones, the information processing device stops reproduction of the content and outputs an AI voice of the dialog, and thus there is a case of giving discomfort to the user due to the interruption of the reproduced content. Therefore, for example, there is a demand for a technology for suppressing, even in a case where another sound element is simultaneously generated during content reproduction, sound interference between the reproduced content and the other sound element by changing a sound source position where the other sound element is heard or a sound source position where the reproduced content is heard.

Therefore, in the present embodiment, this problem is solved by the following means.

For example, an information processing device includes an acquisition unit that acquires a sound element of a content being reproduced and one or a plurality of other sound elements, a determination unit that determines importance levels of the sound elements acquired by the acquisition unit, and a signal processing unit that changes a sound source position of either the sound element of the content being reproduced or the other sound element according to the importance levels of the sound elements determined by the determination unit.

The information processing device changes the sound source position of either the sound element of the content being reproduced or the other sound element according to the importance level of the sound element of the content being reproduced or the one or the plurality of other sound elements. Consequently, sound interference between sound elements can be suppressed by changing the sound source position of each sound element according to the importance level of the sound element without interrupting the content being reproduced. Then, efficiency of information transmission can be improved.

2. Configuration and Operation of Information Processing System of First Embodiment The outline of the present embodiment has been described above, and an information processing system 1 of the first embodiment will be described in detail below.

<2-1. Configuration of Information Processing Device>

FIG. 1 is a diagram illustrating an example of the information processing system 1 according to the first embodiment of the present disclosure. The information processing system 1 illustrated in FIG. 1 includes an information processing device 2 and a sound output device 3 connected to the information processing device 2 and worn by a user. The sound output device 3 is, for example, a headphone, a wireless headphone, a wireless earphone, a neck band type earphone, a speaker, an in-vehicle speaker, or the like. For example, the information processing device 2 generates a 3D sound signal in which the sound source position of each sound element is changed, and outputs the generated 3D sound signal to the sound output device 3 of the user. The user can listen to the sound of each sound element by a sound output of the 3D sound signal of the sound output device 3. The information processing device 2 includes a system sound acquisition unit 11, an external sound acquisition unit 11A, a determination unit 12, and a signal processing unit 13. The system sound acquisition unit 11 acquires a sound element of the content being reproduced and one or a plurality of other sound elements. The sound element is, for example, a sound element of system sound emitted by the information processing device 2. Note that the sound element of the system sound is, for example, a sound element of a reproduced content or the like of music, a moving image, or the like, a sound element of an alarm or the like, a sound element of a telephone sound, a sound element of a dialog such as an AI voice interacting with the user, or the like. The external sound acquisition unit 11A acquires the sound element of external sound such as a car sound using a microphone that is not illustrated.

<2-2. Configuration of Determination Unit>

The determination unit 12 determines an importance level of the sound element acquired by the system sound acquisition unit 11. The importance level of the sound element is information that ranks the degree of importance of the sound element. The signal processing unit 13 changes a sound source position in the sound output device 3 of a sound image of either the sound element of the content being reproduced or the other sound element according to the importance level of the sound element. Furthermore, the signal processing unit 13 may control the direction of the sound source instead of the position of the sound source, or may perform only direction estimation. Moreover, with respect to a sound source arranged in a three-dimensional space, represented by an object audio, control for specifying and/or changing the position thereof may be performed, or control in combination of any of the above may be performed.

The determination unit 12 includes an A/D conversion unit 21, an A/D conversion unit 21A, a separation unit 22, a sound element specification unit 23, a sound position estimation unit 24, an importance level specification unit 25, an importance level table 26, and a comparison unit 27. The A/D conversion unit 21 performs digital conversion of a sound signal of the system sound acquired by the system sound acquisition unit 11. The A/D conversion unit 21A performs digital conversion of a sound signal of the external sound acquired by the external sound acquisition unit 11A. The separation unit 22 separates the sound signal after digital conversion by the A/D conversion unit 21 and the A/D conversion unit 21A for each sound element by frequency analysis or the like. The separation unit 22 separates the sound signal of the system sound or the external sound for each sound element. The sound element specification unit 23 refers to a table that manages types of sound elements, which are not illustrated, and specifies a sound element type of each sound element. For example, the sound element specification unit 23 specifies the sound element type such as a sound element of a reproduced content, a sound element of an alarm, a sound element of a telephone sound, and a sound element of a dialog.

The sound position estimation unit 24 estimates an actual sound source position of each sound element by analyzing the sound elements separated by the separation unit 22. The sound position estimation unit 24 estimates the actual sound source position of each sound element, that is, a sound source position where the sound of the sound element is actually heard. For example, in a case of the sound element of the system sound such as the sound element of the reproduced content, the sound position estimation unit 24 estimates the inside head as the sound source position of the sound image of the sound element of the system sound because the sound output device 3 is worn. The importance level specification unit 25 refers to the importance level table 26 and specifies an importance level of each sound element. The comparison unit 27 compares the importance levels of the sound elements with each other, particularly, the importance level of the sound element of the reproduced content with the importance level of another sound element.

<2-3. Configuration of Signal Processing Unit>

The signal processing unit 13 includes a volume setting unit 31, a sound position setting unit 32, a noise cancellation unit 33, a 3D signal processing unit 34, a D/A conversion unit 35, and an amplifier unit 36. The volume setting unit 31 sets the volume of each sound element after 3D signal processing according to the importance level of each sound element. The volume of each sound element after the 3D signal processing is the volume of each sound element generated by the 3D signal processing unit 34. Note that the volume setting unit 31 refers to a table, which is not illustrated, that manages the volume according to the importance level of the sound element, and sets the volume of each sound element after the 3D signal processing corresponding to the importance level of each sound element.

The sound position setting unit 32 sets the sound source position of each sound element after the 3D signal processing according to the importance level of each sound element. The sound source position of each sound element after the 3D signal processing is the sound source position of each sound element generated by the 3D signal processing unit 34. Note that the sound position setting unit 32 refers to a table that is not illustrated that manages the sound source position according to the importance level of the sound element, and sets a sound position of the sound image of each sound element after the 3D signal processing corresponding to the importance level of each sound element. The noise cancellation unit 33 outputs a noise cancellation signal obtained by performing a noise cancellation process on the sound signal of the external sound after the digital conversion by the A/D conversion unit 21A to the D/A conversion unit 35.

The 3D signal processing unit 34 performs 3D signal processing of convolving a head-related impulse response (HRIR) with a digital signal of a sound element on the basis of the sound source position and the volume of each sound element to generate a 3D sound signal for localizing the sound image of the sound element to a desired sound source position. The head-related impulse response is a representation of a head-related transfer function (HRTF) representing a characteristic until sound emitted from the sound source reaches the user's ear on a time axis. The 3D signal processing unit 34 synthesizes the 3D sound signal of each sound element and outputs the synthesized 3D sound signals of all the sound elements. The 3D signal processing unit 34 generates the 3D sound signal for localizing the sound image of the sound element to a sound source position, for example, to the inside or outside head. Note that the outside head includes, for example, a sound source position separated from the inside head by an arbitrary distance in addition to a sound source position separated from the inside head of the user wearing the sound output device 3 by a certain distance. Furthermore, the 3D signal processing unit 34 also includes a head tracking function of relatively moving the sound source position according to an angular change in the direction of the face of the user.

The D/A conversion unit 35 performs analog conversion of the 3D sound signal of the 3D signal processing unit 34 and the noise cancellation signal subjected to the noise cancellation process by the noise cancellation unit 33. The amplifier unit 36 amplifies the 3D sound signal and the noise cancellation signal after analog conversion and outputs them to the sound output device 3. The information processing device 2 can localize the sound image of each sound element to each sound source position according to the 3D sound signal in a state where the noise cancellation process is performed. Consequently, the user wearing the sound output device 3 can listen to each sound element in a state of not only inside head localization but also outside head localization that sounds as if sounds were emitted from the surroundings.

<2-4. Configuration of Importance Level Table>

Figures 2, 3:
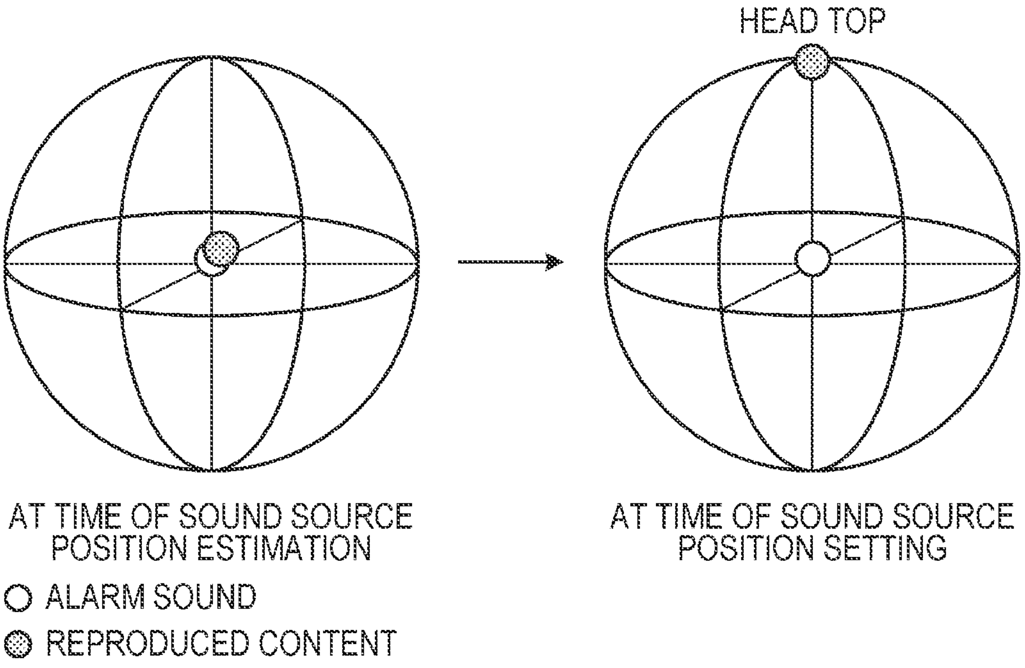
FIG. 2 is a diagram illustrating an example of an importance level table in an information processing device.
FIG. 3 is a diagram illustrating an example of sound source positions of a sound element of a reproduced content and a sound element of an alarm at a time of sound source position specification and a time of sound source position setting.

FIG. 2 is a diagram illustrating an example of the importance level table 26 in the information processing device 2. The importance level table 26 illustrated in FIG. 2 manages the sound element type 262 for identifying the type of the sound element of the system sound in association with each importance level 261. The importance level "1" has the highest degree of importance, and the degree of importance gradually decreases in the order of importance level "2"→importance level "3"→importance level "4"→ . . . and so on. A sound element of the importance level "1" is, for example, a sound element of an alarm or a telephone sound, a sound element of the importance level "2" is, for example, a sound element of a dialog, and a sound element of the importance level "3" is, for example, a sound element of a reproduced content.

The sound source positions of the sound elements include, for example, positions of the inside head or the outside head. Furthermore, the outside head includes, for example, a front surface, a back surface, left and right side surfaces, a head top, and the like. The outside head may be anywhere as long as it is a position around the user's head, and can be appropriately changed. For example, in a case of the sound elements of the reproduced content and the alarm, since the sound elements of these system sounds are output from the sound output device 3, for example, the inside head is set as the actual sound source position. Note that, for convenience of description, it is assumed that the sound source positions of the sound elements are such that, for example, the inside head is the most audible to the user, and are ranked in the order of inside head→outside head of the front surface→outside head of the left and right side surfaces→outside head of the back surface→outside head of the head top, and the degree of being easily audible decreases in this order. Therefore, it is assumed that the sound source position of the sound element with high importance level is set to the inside head→outside head of the front surface→ . . . , and the sound source position of the sound element with low importance level is set to the outside head of the head top, for example. The hierarchy of the sound source positions is managed by a table that is not illustrated that manages the sound source positions according to the importance level. Note that the order of these sound source positions is merely an example, and can be changed as appropriate.

<2-5. Example of Sound Source Position>

FIG. 3 is a diagram illustrating an example of the sound source positions of the sound element of the reproduced content and the sound element of the alarm at the time of sound source position estimation and the time of sound source position setting. Note that, for convenience of description, the actual sound source positions of the sound element of the reproduced content and the sound element of the alarm are, for example, inside head.

The sound position estimation unit 24 estimates the inside head as the actual sound source positions of the sound element of the alarm and the sound element of the reproduced content. On the other hand, the sound position setting unit 32 compares the importance level "1" of the sound element of the alarm with the importance level "3" of the sound element of the reproduced content. Then, since the importance level of the sound element of the alarm is higher, the sound position setting unit 32 sets the alarm to the inside head and the reproduced content to the outside head of the head top as the sound source positions after the 3D signal processing. Since the sound source position of the alarm is localized to the inside head and the sound source position of the reproduced content is localized to the outside head of the head top, the sound source positions of the alarm sound and the reproduced content do not overlap. Therefore, by suppressing sound interference between the reproduced content and the alarm, the user can easily hear both the reproduced content and the alarm sound.

<2-6. First 3D Signal Generating Process>

Figure 4:
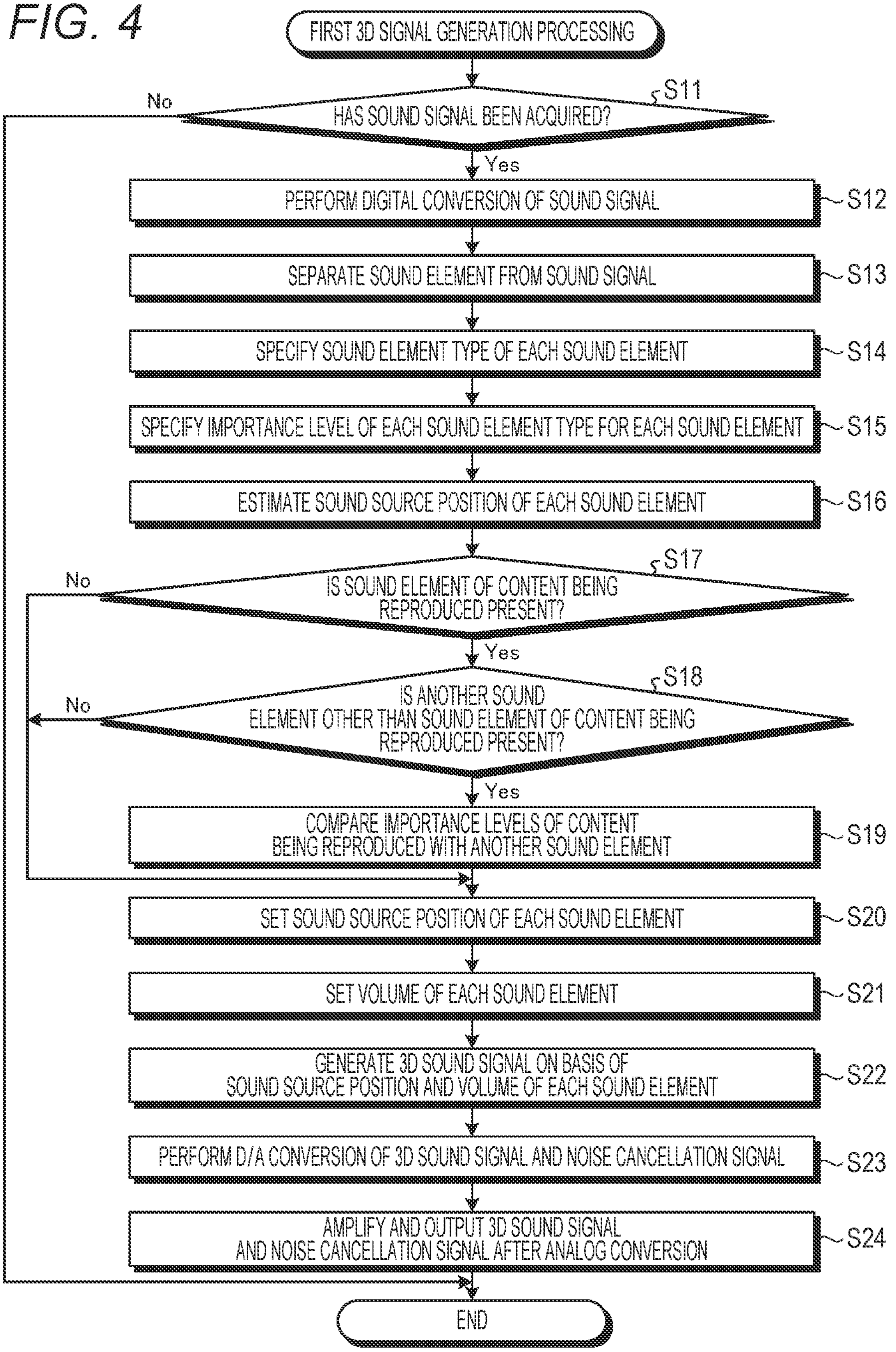
FIG. 4 is a flowchart illustrating an example of a processing operation of the information processing device according to a first 3D signal generating process.

FIG. 4 is a flowchart illustrating an example of a processing operation of the information processing device 2 according to the first 3D signal generating process of the first embodiment. In FIG. 4, the system sound acquisition unit 11 in the information processing device 2 determines whether or not a sound signal has been acquired (step S11). Note that the sound signal is a sound signal including system sound emitted by the information processing device 2.

In a case where the sound signal has been acquired (step S11: Yes), the A/D conversion unit 21 in the information processing device 2 performs digital conversion of the sound signal (step S12). Note that the A/D conversion unit 21A performs digital conversion of the sound signal of the external sound acquired by the external sound acquisition unit 11A. Then, the noise cancellation unit 33 adds the noise cancellation signal obtained by performing the noise cancellation process on the sound signal of the external sound to the signal output from the 3D signal processing unit 34, and then outputs the signal to the D/A conversion unit 35. The separation unit 22 in the information processing device 2 separates the sound element of the system sound from the sound signal after digital conversion by frequency analysis, sound source separation technique, or the like (step S13). The sound element specification unit 23 in the information processing device 2 specifies the sound element type of each sound element on the basis of a sound element separation result (step S14). The importance level specification unit 25 in the information processing device 2 refers to the importance level table 26 and specifies the importance level of each sound element (step S15).

The sound position estimation unit 24 in the information processing device 2 estimates the actual sound source position of each sound element from an analysis result of each sound element (step S16). The comparison unit 27 in the information processing device 2 determines whether or not a sound element of the content being reproduced is present in the sound elements (step S17). In a case where a sound element of the content being reproduced is present in the sound elements (step S17: Yes), the comparison unit 27 determines whether or not another sound element other than the sound element of the content being reproduced is present in the sound elements (step S18). Note that the another sound element is a sound element other than the content being reproduced in the system sound.

In a case where another sound element is present (step S18: Yes), the comparison unit 27 compares the importance level of the sound element of the content being reproduced with the importance level of the another sound element (step S19). The sound position setting unit 32 in the information processing device 2 sets the sound source position of each sound element after the 3D signal processing according to the importance level of each sound element (step S20). For example, in a case where an alarm and content being reproduced occur as sound elements, the importance level of the alarm is "1", and the importance level of the content being reproduced is "3". Therefore, the sound position setting unit 32 sets the sound source position of the alarm to the inside head and the sound source position of the content being reproduced to the outside head of the head top as the sound source positions after the 3D signal processing.

Moreover, the volume setting unit 31 in the information processing device 2 sets the volume of each sound element after the 3D signal processing according to the importance level of each sound element type (step S21). The volume setting unit 31 sets, for example, the volume of the alarm to 1 time and the volume of the content being reproduced to 1 time as the volumes after the 3D signal processing. Note that, as the volumes after the 3D signal processing, for example, the volume setting unit 31 may set the volume of the alarm to 1 time, the volume of the content being reproduced to 0.75 times, the volume of the alarm to 2 times, and the volume of the content being reproduced to 1 time, and can appropriately change the volume. The 3D signal processing unit 34 in the information processing device 2 generates a 3D sound signal of each sound element on the basis of the set sound source position and volume of each sound element after the 3D signal processing, and synthesizes and outputs the 3D sound signals for all the sound elements (step S22). The 3D signal processing unit 34 convolves a head impact response with the sound signal of each sound element on the basis of the sound source position and the volume of each sound element to generate the 3D sound signal of each sound element. Then, the 3D signal processing unit 34 synthesizes and outputs the 3D sound signal of each of all the sound elements.

The D/A conversion unit 35 in the information processing device 2 performs analog conversion of the synthesized 3D sound signal and noise cancellation signal (step S23). The amplifier unit 36 in the information processing device 2 amplifies the 3D sound signal and the noise cancellation signal after analog conversion, outputs the amplified 3D sound signal and noise cancellation signal to the sound output device 3 (step S24), and ends the processing operation illustrated in FIG. 4.

In a case where the sound signal has not been acquired (step S11: No), the system sound acquisition unit 11 ends the processing operation illustrated in FIG. 4. Furthermore, in a case where a sound element of the content being reproduced is not present in the sound elements (step S17: No), the sound position setting unit 32 proceeds to step S20 so as to set the sound source position of each sound element. In a case where another sound element other than the sound element of the content being reproduced is not present in the sound elements (step S18: No), the sound position setting unit 32 proceeds to step S20 so as to set the sound source position of each sound element.

The information processing device 2 compares the importance level of the sound element of the content being reproduced with the importance level of another sound element, sets the sound source position and the volume of each sound element after the 3D signal processing according to the importance level, and generates the 3D sound signal on the basis of the sound source position and the volume of each sound element. Moreover, the information processing device 2 provides the sound output device 3 with the 3D sound signal and the noise cancellation signal at the sound source position and with the volume according to the importance level. The information processing device 2 can suppress sound interference between the sound element of the reproduced content and another sound element in the system sound by changing the sound source position and the volume of each sound element according to the importance level, for example, by changing the sound source position between the sound element of the reproduced content and the another sound element in the system. Moreover, sound interference between sound elements in the system sound can be suppressed. Then, efficiency of information transmission of the system sound can be improved.

In the first embodiment, the sound source position in the sound output device 3 of the sound image of either the sound element of the content being reproduced or another sound element is changed according to the importance level of the sound element of the content being reproduced and the one or the plurality of other sound elements. Consequently, the sound source position of each sound element is changed according to the importance level of the sound element without interrupting the content being reproduced, thereby suppressing sound interference between the sound elements in the system sound, thereby improving the efficiency of information transmission.

Furthermore, for example, sound source positions of the reproduced content and another sound element are changed to the outside head according to the importance level of the system sound, and the sound source position is laid out by separating another sound element desired to be heard and the reproduced content. Consequently, it is possible to easily listen to the sound desired to be heard by using the importance level of each sound element reflecting the intention of the user.

Note that, for convenience of description, as illustrated in FIG. 3, the sound position setting unit 32 sets the reproduced content to the outside head of the head top and the alarm to the inside head as the sound source positions after the 3D signal processing. However, the alarm may be set to the outside head of the head top and the reproduced content may be set to the inside head as the sound source positions after the 3D signal processing. Furthermore, it is sufficient if the sound position setting unit 32 sets the sound source positions of both the reproduced content and the alarm to different positions of the outside head as the sound source positions after the 3D signal processing. Furthermore, the sound position setting unit 32 may set the alarm with high importance level to the outside head of the front surface and the reproduced content to the outside head of the head top, as the sound source positions after the 3D signal processing.

Furthermore, in a case where the alarm sound has urgency and the importance level is much higher as compared to the importance level of the sound element of the reproduced content, the volume setting unit 31 may increase the volume of the sound element of the alarm after the 3D signal processing and decrease the volume of the sound element of the reproduced content after the 3D signal processing. Note that the case where the importance level is much higher is, for example, a case where the importance levels are two or more levels apart. Further, in a case where the alarm has urgency and the importance level is much higher as compared to the importance level of the sound element of the reproduced content, the reproduction of the reproduced content may be stopped instead of adjusting the volume. Furthermore, the reproduced content may be canceled using the noise cancellation unit 33.

Note that, in the information processing device 2 of the first embodiment, the case where the sound source position and the volume of each sound element in the system sound are adjusted according to the importance level of the sound element in the system sound has been exemplified, but it is not limited to the sound element of the system sound, and can also be applied to an external sound such as a car sound, for example. Therefore, the embodiment will be described below.

3. Configuration and Operation of Information Processing System of Second Embodiment

<3-1. Configuration of Information Processing Device>

Figure 5:
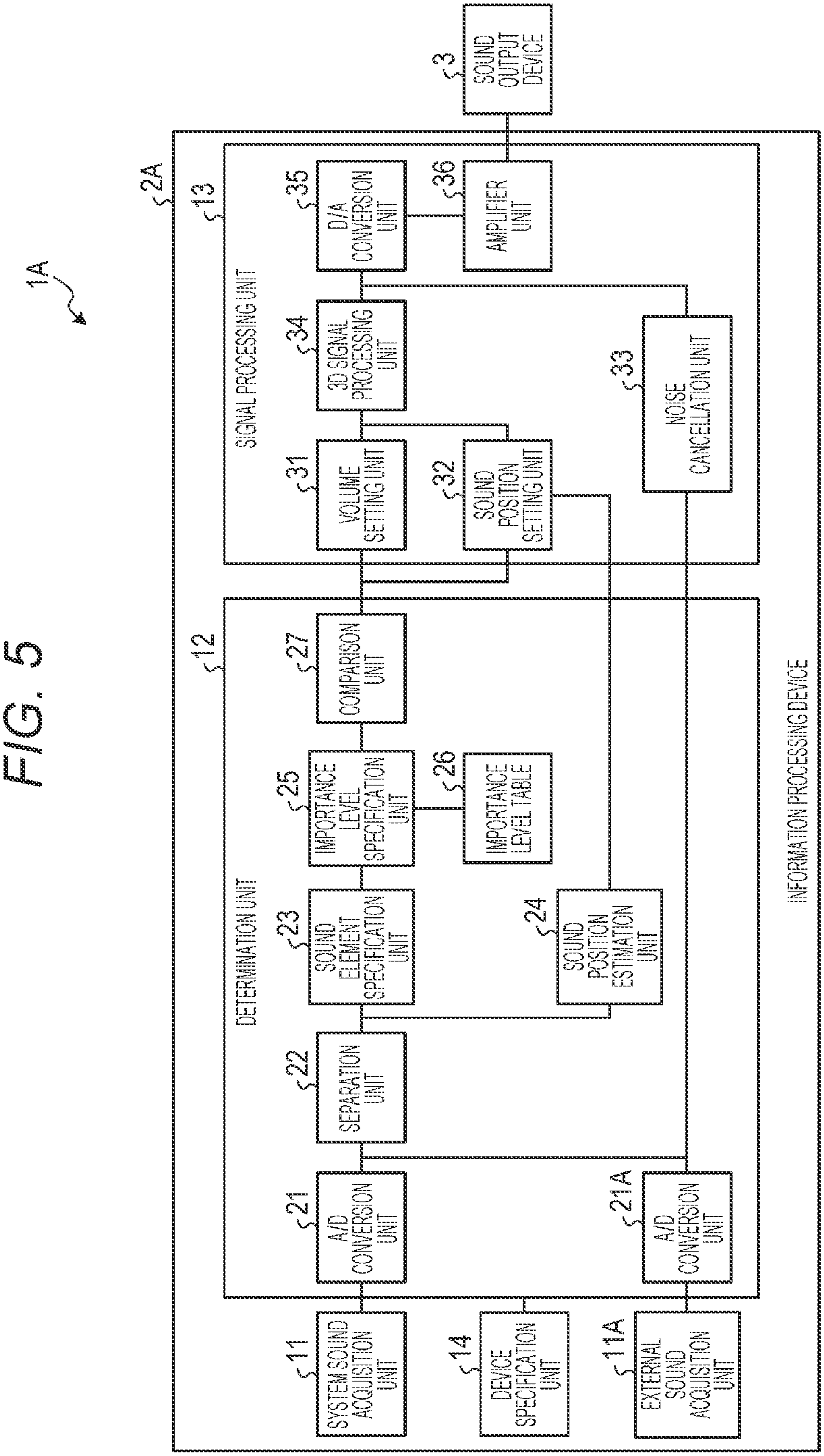
FIG. 5 is a diagram illustrating an example of an information processing system according to a second embodiment.

FIG. 5 is a diagram illustrating an example of an information processing system 1A according to a second embodiment. Note that the same components as those of the information processing system 1 of the first embodiment are denoted by the same reference numerals, and the description of overlapping components and operations will be omitted. The external sound acquisition unit 11A of an information processing device 2A illustrated in FIG. 5 acquires a sound signal of an external sound through a microphone that is not illustrated. The microphone is, for example, a microphone array including a plurality of microphones. The microphone is assumed to be incorporated in the sound output device 3, for example. Note that, although the case has been exemplified where the microphone is incorporated in the sound output device 3, the microphone may be separately provided and can be appropriately changed.

Moreover, the information processing device 2A includes a device specification unit 14 that specifies the type of the sound output device 3. Types of the sound output device 3 include a headphone of an ear hole opening type worn by the user in a state where the ear hole of the user is opened, a headphone of an ear hole non-opening type worn like an ear plug, and the like. The ear hole opening type headphone is, for example, an open type headphone, and the ear hole non-opening type headphone is, for example, a canal type headphone. The device specification unit 14 may specify, for example, the sound output device 3 by the device type input by the user through a setting operation when connecting the sound output device 3 to the information processing device 2A. Furthermore, the device specification unit 14 may specify, for example, the device type through negotiation with the information processing device 2A when the sound output device 3 is connected to the information processing device 2A, and can be appropriately changed.

The separation unit 22 in the determination unit 12 separates sound elements such as the external sound and the system sound from the sound signal after digital conversion by the A/D conversion unit 21 and the A/D conversion unit 21A. The sound element specification unit 23 specifies the sound element type of a sound element such as the external sound or the system sound. The sound position estimation unit 24 estimates the sound source position of an actual sound element from the sound element such as the external sound or the system sound. For example, the sound position estimation unit 24 estimates an actual sound source position at which a car sound is heard. The importance level specification unit 25 refers to an importance level table 26A as described later and specifies the importance level for each sound element of the external sound or the system sound.

In a case where the sound output device 3 worn by the user is the headphone of the ear hole opening type, the signal processing unit 13 adjusts the sound source position and the volume of a sound element in the system sound other than the sound element of the external sound. In a case where the sound output device 3 worn by the user is the headphones of the ear hole non-opening type, the signal processing unit 13 adjusts the sound source position and the volume of a sound element of the external sound in addition to the sound element of the system sound.

<3-2. Configuration of Importance Level Table>

Figures 6, 7:
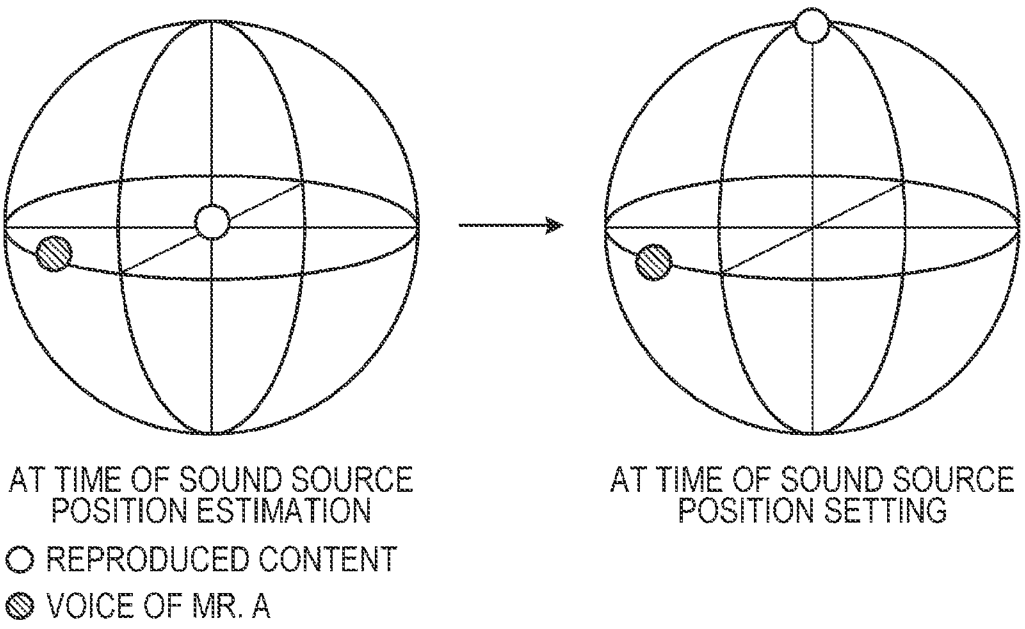
FIG. 6 is a diagram illustrating an example of an importance level table in an information processing device.
FIG. 7 is a diagram illustrating an example of the sound source positions of the sound element of the reproduced content and the sound element of an external sound (car sound) at the time of sound source position specification and the time of sound source position setting.

FIG. 6 is a diagram illustrating an example of the importance level table 26A in the information processing device 2A. The importance level table 26A illustrated in FIG. 6 is a table that manages the importance level of each of the sound element of the system sound and the sound element of the external sound in association with each other. The sound element of the importance level 1 includes, for example, sound elements of the external sounds of a baby's cry, a voice of Mr. A, a fixed telephone sound, and the like, and sound elements of the system sounds of an alarm sound, a telephone sound, and the like. The sound element of the importance level 2 includes, for example, a sound element of the system sound of a content being reproduced. The sound element of the importance level 3 includes, for example, a sound element of the external sound of a voice of a person other than Mr. A, a car sound, and the like.

<3-3. Example of Sound Source Position>

For example, it is assumed a case where the sound output device 3 worn by the user is the headphones of the ear hole non-opening type and an external sound and a reproduced content occur. In a case where the importance level of the external sound is higher than that of the reproduced content, the sound position setting unit 32 sets the external sound to the actual sound source position and the reproduced content to the outside head of the head top as the sound source positions after the 3D signal processing. Furthermore, in a case where the importance level of the reproduced content is higher than that of the external sound or the system sound, the sound position setting unit 32 sets the reproduced content to the inside head or the outside head of the front surface, and the external sound to a sound source position different from the sound source position of the reproduced content, as the sound source positions after the 3D signal processing.

It is assumed a case where the sound output device 3 worn by the user is the headphones of the ear hole opening type and an external sound and a reproduced content occur. In a case where the importance level of the external sound is higher than that of the reproduced content, the sound position setting unit 32 sets the reproduced content to the outside head of the head top as the sound source position after the 3D signal processing. Further, in a case where the importance level of the reproduced content is higher than that of the external sound, the sound position setting unit 32 sets the reproduced content to the inside head or the outside head of the front surface as the sound source position after the 3D signal processing. Furthermore, in a case where the importance level of the reproduced content is higher than those of other system sounds, the sound position setting unit 32 sets the reproduced content to the inside head or the outside head of the front surface, and the other system sounds to sound source positions different from that of the reproduced content, as the sound source positions after the 3D signal processing.

FIG. 7 is a diagram illustrating an example of the sound source positions of the sound element of the reproduced content and the sound element of the external sound at the time of sound source position estimation and the time of sound source position setting. For example, it is assumed a case where the user wearing the headphones of the ear hole opening type is with Mr. A while reproducing the content.

In a case where there is no conversation between the user and Mr. A, the sound position estimation unit 24 estimates the inside head as the actual sound source position of the reproduced content. Since there is no conversation between the user and Mr. A and the importance level of the sound element of the reproduced content is the highest, the sound position setting unit 32 sets the reproduced content to the outside head of the front surface as the sound source position after the 3D signal processing. On the other hand, in a case where there is a conversation between the user and Mr. A, the sound position estimation unit 24 estimates the actual sound source position of the voice of Mr. A. Since the sound element of the voice of Mr. A has the highest importance level, the sound position setting unit 32 sets the reproduced content to the outside head of the head top as the sound source position after the 3D signal processing. Consequently, since it is the headphones of the ear hole opening type, the user can directly listen to the voice of Mr. A from the actual sound source position while listening to the reproduced content from the head top like BGM. That is, since the information processing device 2A adjusts the sound source position where the reproduced content can be heard in order to prioritize the voice of Mr. A, it is possible to suppress sound interference between the voice of Mr. A and the reproduced content.

Furthermore, for example, it is assumed a case where the user wearing the headphones of the ear hole non-opening type is with Mr. A while reproducing a content. In a case where there is no conversation between the user and Mr. A, the sound position estimation unit 24 estimates the inside head as the actual sound source position of the reproduced content. Since there is no conversation between the user and Mr. A and the importance level of the sound element of the reproduced content is the highest, the sound position setting unit 32 sets the reproduced content to the outside head of the front surface as the sound source position after the 3D signal processing. On the other hand, in a case where there is a conversation between the user and Mr. A, the sound position estimation unit 24 estimates the actual sound source position as the sound source position of the voice of Mr. A. Since the sound element of the voice of Mr. A has the highest importance level, the sound position setting unit 32 sets the reproduced content to the outside head of the head top and the voice of Mr. A to the actual sound source position (outside head) as the sound source positions after the 3D signal processing. Consequently, since it is the headphones of the ear hole non-opening type, the user can listen to the voice of Mr. A from the actual sound source position while listening to the reproduced content from the head top like BGM. That is, since the information processing device 2A adjusts the sound source and the volume in order to prioritize the voice of Mr. A, it is possible to suppress sound interference between the voice of Mr. A and the reproduced content.

<3-4. Second 3D Signal Generating Process>

Figure 8:
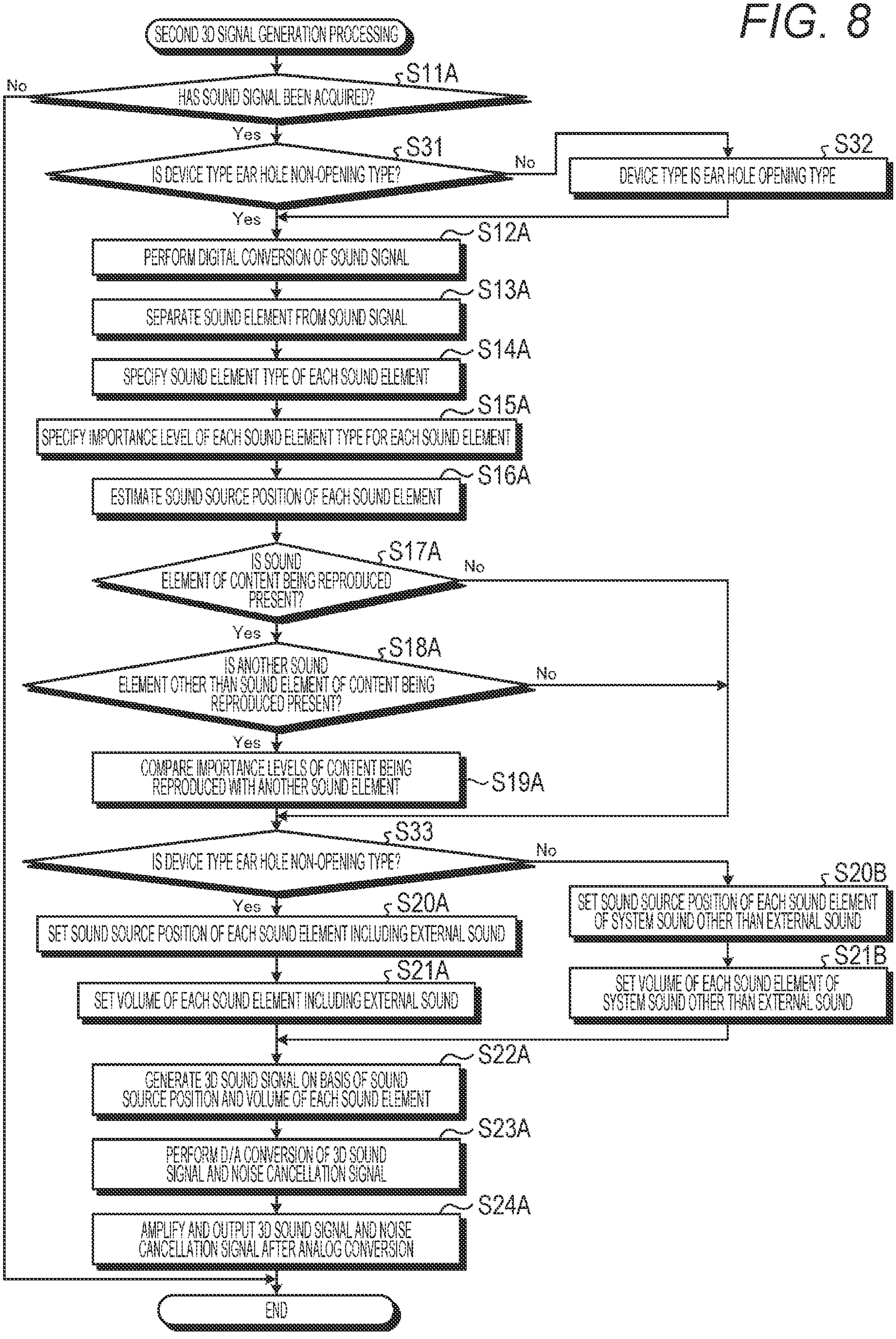
FIG. 8 is a flowchart illustrating an example of a processing operation of the information processing device according to a second 3D signal generating process.

FIG. 8 is a flowchart illustrating an example of a processing operation of the information processing device 2A according to a second 3D signal generating process of the second embodiment. In FIG. 8, the system sound acquisition unit 11 and the external sound acquisition unit 11A in the information processing device 2A determine whether or not a sound signal has been acquired (step S11A). Note that the sound signal includes the sound signal of the external sound acquired by the external sound acquisition unit 11A in addition to the sound signal of the system sound emitted by the information processing device 2A.

In a case where the device specification unit 14 in the information processing device 2A has acquired the sound signal (step S11A: Yes), it is determined whether or not the sound output device 3 connected to the information processing device 2 is the headphones of the ear hole non-opening type (step S31). The sound output device 3 connected to the information processing device 2 is the headphones of the ear hole non-opening type or the headphones of the ear hole opening type worn by the user. In a case where the sound output device 3 is the headphones of the ear hole non-opening type (step S31: Yes), the A/D conversion unit 21 performs digital conversion of the sound signal (step S12A). The separation unit 22 in the information processing device 2A separates a sound element including an external sound from the sound signal after digital conversion by the frequency analysis, the sound source separation technique, or the like (step S13A). The sound element specification unit 23 in the information processing device 2A specifies a sound element type of each sound element including the external sound on the basis of the sound element separation result (step S14A). Note that the sound element type includes the sound element type of the external sound in addition to the sound element type of the system sound.

The importance level specification unit 25 in the information processing device 2A refers to the importance level table 26A and specifies the importance level for each sound element including the external sound (step S15A). The sound position estimation unit 24 in the information processing device 2A estimates the actual sound source position of each sound image of the sound element including the external sound from the analysis result of each sound element (step S16A).

The comparison unit 27 in the information processing device 2A determines whether or not a sound element of the content being reproduced is present in the sound elements (step S17A). In a case where a sound element of the content being reproduced is present in the sound elements (step S17A: Yes), the comparison unit 27 determines whether or not another sound element other than the sound element of the content being reproduced is present in the sound elements (step S18A).

In a case where another sound element is present (step S18A: Yes), the comparison unit 27 compares the importance level of the sound element of the content being reproduced with the importance level of another sound element (step S19A). The sound position setting unit 32 in the information processing device 2A determines whether or not the sound output device 3 of the user is the headphones of the ear hole non-opening type (step S33). In a case where the sound output device 3 of the user is the headphones of the ear hole non-opening type (step S33: Yes), the sound position setting unit 32 sets the sound source position after the 3D signal processing of each sound element according to the importance level of each sound element including the external sound and the system sound (step S20A). Note that the sound position setting unit 32 determines that the importance level of the voice of Mr. A is the highest in a case where the sound output device 3 is the headphones of the ear hole non-opening type and the sound element is the voice of Mr. A and content being reproduced. The sound position setting unit 32 sets the voice of Mr. A to the actual sound source position (outside head) and the content being reproduced to the outside head of the head top as the sound source positions after the 3D signal processing.

Moreover, the volume setting unit 31 in the information processing device 2A sets the volume after the 3D signal processing of each sound element according to the importance level of each sound element including the system sound and the external sound (step S21A). Note that the volume setting unit 31 sets the volume of the voice of Mr. A to 1 time and the volume of the content being reproduced to 1 time as the volumes after the 3D signal processing. The 3D signal processing unit 34 in the information processing device 2A generates the 3D sound signal of each sound element on the basis of the sound source position and the volume after the 3D signal processing of each sound element, and synthesizes and outputs the 3D sound signals for all the sound elements (step S22A). The 3D signal processing unit 34 convolves the head impact response of each sound element on the basis of the sound source position and the volume of each sound element to generate the 3D sound signal of each sound element. Then, the 3D signal processing unit 34 synthesizes and outputs all the 3D sound signals of each sound element including the system sound and the external sound.

The D/A conversion unit 35 in the information processing device 2A performs analog conversion of the noise cancellation signal from the noise cancellation unit 33 and all the 3D sound signals (step S23A). The amplifier unit 36 in the information processing device 2A amplifies and outputs the 3D sound signal and the noise cancellation signal after analog conversion to the sound output device 3 (step S24A), and ends the processing operation illustrated in FIG. 8.

In a case where the sound output device 3 connected to the information processing device 2 is not the headphones of the ear hole non-opening type (step S31: No), the device specification unit 14 determines that the device type is the headphones of the ear hole opening type (step S32), and proceeds to step S12A to convert the sound signal into a digital signal. Furthermore, after comparing the importance levels in step S19A, in a case where the sound output device 3 of the user is not the headphones of the ear hole non-opening type (step S33: No), the sound position setting unit 32 determines that the sound output device 3 of the user is the headphones of the ear hole opening type. The sound position setting unit 32 sets the sound source position after the 3D signal processing for each sound element according to the importance level of each sound element including the system sound other than the external sound (step S20B). Note that, for example, in a case where the sound element is the voice of Mr. A and the content being reproduced, the sound position setting unit 32 determines that the importance level of the voice of Mr. A is the highest. Consequently, the sound position setting unit 32 can suppress interference between the content being reproduced and the voice of Mr. A by setting the content being reproduced to the outside head of the head top as the sound source position after the 3D signal processing.

Moreover, the volume setting unit 31 sets the volume after the 3D signal processing of each sound element according to the importance level of each sound element including the system sound other than the external sound (step S21B), and proceeds to step S22A to generate the 3D sound signal on the basis of the volume and the sound source position of each sound element. Note that the volume setting unit 31 sets the volume of the sound element of the content being reproduced to 1 time without adjusting the volume of the voice of Mr. A.

In a case where the system sound acquisition unit 11 and the external sound acquisition unit 11A have not acquired the sound signal (step S11A: No), the processing operation illustrated in FIG. 8 ends. Furthermore, in a case where the sound element of the content being reproduced is not present in the sound elements (step S17A: No), the sound position setting unit 32 proceeds to step S33 to determine whether or not the sound output device 3 is the headphones of the ear hole non-opening type. In a case where another sound element other than the sound element of the content being reproduced is not present in the sound elements (step S18A: No), the sound position setting unit 32 proceeds to step S33 to determine whether or not the sound output device 3 is the headphones of the ear hole non-opening type.

In the information processing device 2A of the second embodiment, in a case where the sound output device 3 of the user is the headphones of the ear hole opening type, the sound source position of the sound element of the system sound other than the external sound is adjusted according to the importance level of the sound element of the system sound and the external sound. Consequently, the sound source position of the system sound can be adjusted so as not to disturb the external sound. That is, sound interference between a sound element in the system sound and another sound element in the external sound can be suppressed.

In the information processing device 2A, in a case where the sound output device 3 of the user is the headphones of the ear hole non-opening type, the sound source positions of the sound elements of the system sound and the external sound are adjusted according to the importance levels of the sound elements of the system sound and the external sound. Consequently, the sound source positions of the system sound and the external sound can be adjusted so as not to disturb the external sound. That is, sound interference between a sound element in the system sound and another sound element in the external sound can be suppressed.

In the above-described information processing system 1A of the second embodiment, the case has been exemplified where the sound source position of the control target of the sound element is changed according to the type of the sound output device 3 worn by the user. However, the importance level of each sound element may be changed according to the current position of the user wearing the sound output device 3, and an embodiment thereof will be described below.

4. Configuration and Operation of Information Processing System of Third Embodiment

<4-1. Configuration of Information Processing Device>

Figure 9:
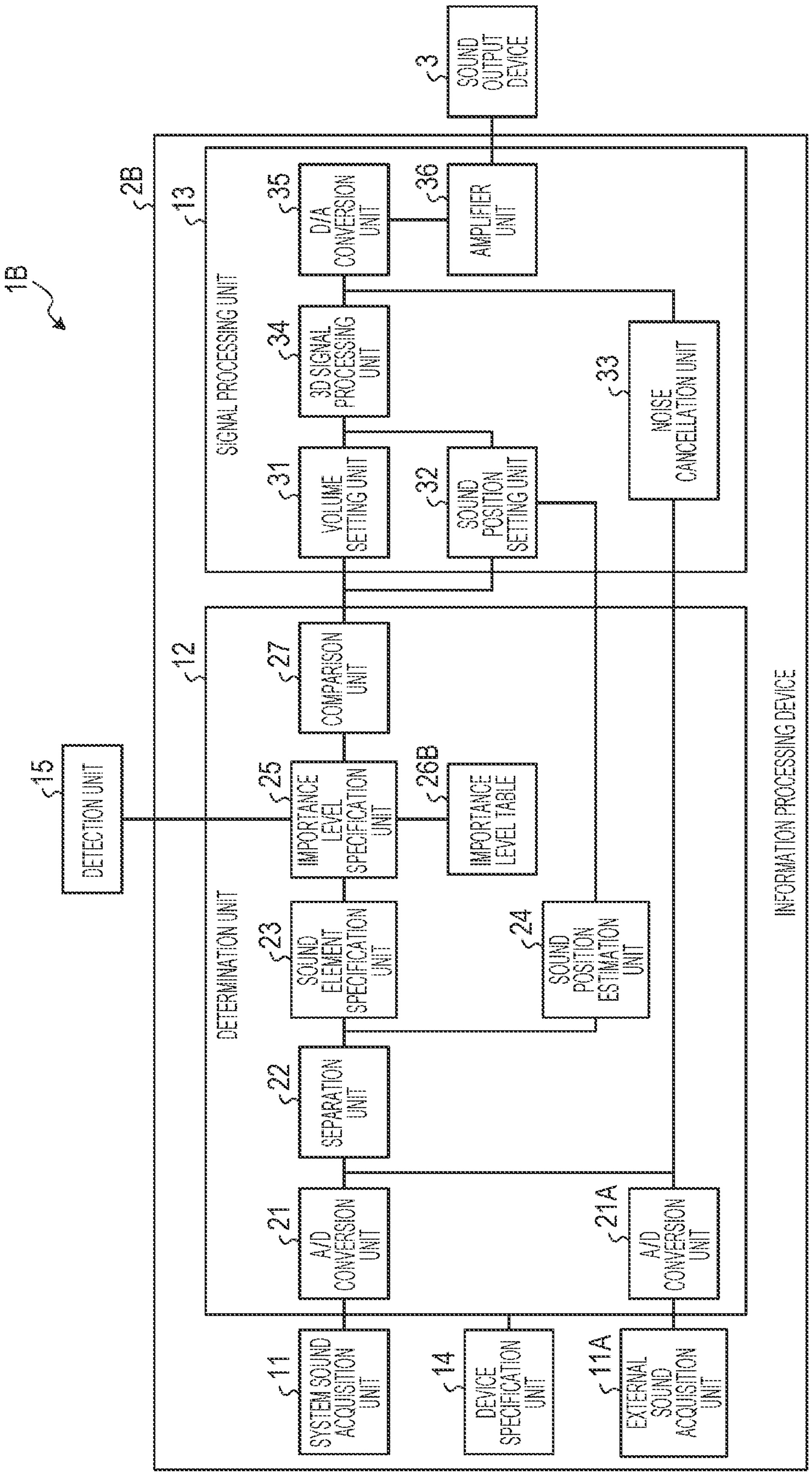
FIG. 9 is a diagram illustrating an example of an information processing system according to a third embodiment.

FIG. 9 is a diagram illustrating an example of an information processing system 1B according to a third embodiment. Note that the same components as those of the information processing system 1B of the second embodiment are denoted by the same reference numerals, and the description of the overlapping components and operations will be omitted. An information processing device 2B illustrated in FIG. 9 includes a detection unit 15 that detects the current position of the user wearing the sound output device 3. The detection unit 15 is a function of detecting the current position of the user using, for example, a global positioning system (GPS) or the like. Note that, for convenience of description, the detection unit 15 detects, for example, home or outside the home as the current position.

In a case where the current position of the user is the home, the determination unit 12 sets the importance level of each sound element according to the home. In a case where the current position of the user is outside the home, the determination unit 12 sets the importance level of each sound element according to outside the home. In a case where the current position is the home, the signal processing unit 13 adjusts the sound source position and the volume of the sound element on the basis of the importance level of each sound element according to the home. In a case where the current position is outside the home, the signal processing unit 13 adjusts the sound source position and the volume of the sound element on the basis of the importance level of each sound element according to outside the home. Furthermore, it is assumed that the signal processing unit 13 does not change the sound source position because, for example, a car sound among the external sounds of outside the home has no meaning if the actual sound source position is changed.

<4-2. Configuration of Importance Level Table>

FIG. 10 is a diagram illustrating an example of an importance level table 26B in the information processing device 2B. The importance level table 26B illustrated in FIG. 10 is a table that manages sound element types of each importance level at home and sound element types of each importance level outside the home in association with each other.

The sound element of the importance level 1 at home includes, for example, sound elements of the external sounds of a baby's cry, a voice of Mr. A, and a telephone sound, and sound elements of the system sounds of an alarm and a fixed telephone sound. The sound element of the importance level 2 at home includes, for example, a sound element of the system sound of the content being reproduced. The sound element of the importance level 3 at home includes, for example, a sound element of the external sound of a voice of a person other than Mr. A or a car sound.

On the other hand, the sound element of the importance level 1 outside the home includes, for example, sound elements of the external sounds of a baby's cry, a voice of Mr. A, a telephone sound, and a car sound, and a sound element of the system sound of an alarm. The sound element of the importance level 2 outside the home includes, for example, a sound element of the system sound of the content being reproduced. The sound element of the importance level 3 outside the home includes, for example, sound elements of the external sounds of a voice of a person other than Mr. A and a fixed telephone sound.

In a case where the importance level at home is compared with the importance level outside the home, the importance level at home is set such that, for example, the importance level of the fixed telephone sound is high and the importance level of the car sound is low. On the other hand, as the importance level outside the home, for example, the importance level of the car sound is set to be high, and the importance level of the fixed telephone sound is set to be low. Furthermore, the importance level of each sound element may be appropriately set and changed by the user.

<4-3. Example of Sound Source Position>

Figure 11:
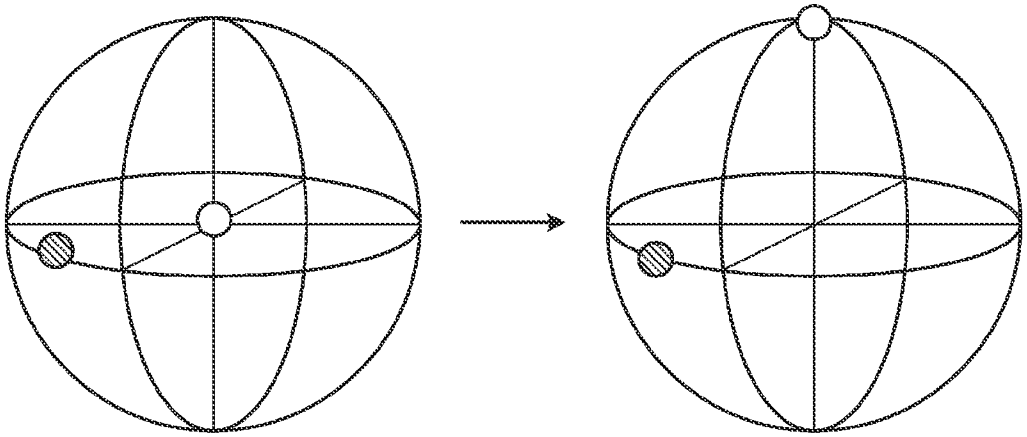
FIG. 11 is a diagram illustrating an example of the sound source positions of the sound element of the reproduced content and the sound element of the external sound (car sound) at the time of sound source position specification and the time of sound source position setting.

FIG. 11 is a diagram illustrating an example of the sound source positions of the sound element of the reproduced content and the sound element of the external sound at the time of sound source position estimation and the time of sound source position setting. For example, it is assumed a case where a reproduced content and a sound element of a car sound occur outside the home of the user wearing the headphones of the ear hole non-opening type.

With the importance level of the sound element of the car being highest because it is outside the home, the sound position setting unit 32 sets the reproduced content to the outside head of the head top and the car sound to the actual sound source position (outside head) as the sound source positions after the 3D signal processing. At this time, the volume setting unit 31 sets the volume of the car sound to 1.5 times and the volume of the reproduced content to 0.5 times as the volumes after the 3D signal processing. Consequently, since the user is outside the home, the risk with respect to the car is high, and the user can increase the volume of the car from the actual position of the car and strongly recognize the presence of the car. In recent years, since the sound of an automobile has been reduced, it is possible to make the user strongly recognize the presence of the automobile by adjusting the volume of the sound of the automobile to be increased.

On the other hand, for example, it is assumed a case where sound elements of the reproduced content and the car sound occur at the home of the user wearing the headphones of the ear hole non-opening type. The sound position estimation unit 24 estimates an actual sound source position (inside head) as the sound source position of the reproduced content and an actual sound source position as the sound source position of the car sound. With the importance level of the sound element of the reproduced content being highest because it is at home, the sound position setting unit 32 sets the reproduced content to the outside head of the front surface and the car sound to the actual sound source position (outside head) as the sound source positions of each 3D signal processing. At this time, the volume setting unit 31 sets the volume of the reproduced content to 1 time and the volume of the car sound to 0 times as the volumes after the 3D signal processing. The risk with respect to the car at home is low, the user can listen to the reproduced content from the outside head of the front surface by erasing the car sound. Furthermore, by erasing unnecessary external sounds, there is also an effect such as reducing the burden on the user's brain and being less tiring.

For example, it is assumed a case where sound elements of the reproduced content and the car sound occur at the home of the user wearing the headphones of the ear hole opening type. The sound position estimation unit 24 estimates an actual sound source position (inside head) as the sound source position of the reproduced content and an actual sound source position as the sound source position of the car sound. With the importance level of the sound element of the reproduced content being highest because it is at home, the sound position setting unit 32 sets the reproduced content to the outside head of the front surface as the sound source position after the 3D signal processing. At this time, the volume setting unit 31 sets the volume of the reproduced content to 1 time as the volume after the 3D signal processing. Since the risk with respect to the car at home is low, the user can listen to the reproduced content from the outside head of the front surface while listening to the actual car sound.

On the other hand, for example, it is assumed a case where the sound elements of the reproduced content and the car sound occur outside the home of the user wearing the headphones of the ear hole opening type. With the importance level of the sound element of the car being highest because it is outside the home, the sound position setting unit 32 sets the reproduced content to the outside head of the head top as the sound source position after the 3D signal processing. At this time, the volume setting unit 31 sets the volume of the reproduced content to 0.5 times as the volume after the 3D signal processing. Consequently, the risk with respect to the car outside the home is high, and the user can recognize presence of the car by directly listening to the car sound from the actual position of the car while listening to the reproduced content like BGM from the head top. Furthermore, the importance levels of sound elements other than the car may be appropriately set to be the highest.

Furthermore, for example, it is assumed a case where a sound element of the reproduced content and a sound element of the voice of Mr. A occur at the home of the user wearing the headphones of the ear hole non-opening type. The sound position estimation unit 24 estimates the sound source position (inside head) of the reproduced content and the actual sound source position (outside head) of the voice of Mr. A as the actual sound source positions. On the other hand, the sound position setting unit 32 sets the reproduced content to the outside head of the head top and the voice of Mr. A to the actual sound source position (outside head) as the sound source positions after the 3D signal processing. The volume setting unit 32 sets the volume of the reproduced content and the volume of the voice of Mr. A to 1 time as the volumes after the 3D signal processing. Consequently, the user can listen to the voice of Mr. A while listening to the reproduced content from the head top like BGM.

For example, it is assumed a case where a sound element of the reproduced content and a sound element of the voice of Mr. A occur at the home of the user wearing the headphones of the ear hole opening type. The sound position estimation unit 24 estimates the sound source position (inside head) of the reproduced content and the actual sound source position (outside head) of the voice of Mr. A as the actual sound source positions. On the other hand, the sound position setting unit 32 sets the reproduced content to the outside head of the head top as the sound source position after the 3D signal processing. The volume setting unit 32 sets the volume of the reproduced content to 1 time as the volume after the 3D signal processing. Consequently, the user can directly listen to the voice of Mr. A while listening to the reproduced content from the head top like BGM.

Furthermore, for example, it is assumed a case where a sound element of the reproduced content and a sound element of the car sound occur outside the home of the user wearing the headphones of the ear hole non-opening type. The sound position estimation unit 24 estimates the sound source position (inside head) of the reproduced content and the actual sound source position of the car sound as the actual sound source positions. On the other hand, the sound position setting unit 32 sets the reproduced content to the outside head of the head top and the car sound to the actual sound source position (outside head) as the sound source positions after the 3D signal processing. The volume setting unit 31 sets the volume of the reproduced content to 0.5 times and the volume of the car sound to 1 time as the volumes after the 3D signal processing. Consequently, the user can listen to the car sound while listening to the reproduced content from the outside head of the head top like BGM.

For example, it is assumed a case where a sound element of the reproduced content and a sound element of the car sound occur outside the home of the user wearing the headphones of the ear hole opening type. The sound position estimation unit 24 estimates the sound source position (inside head) of the reproduced content and the actual sound source position of the car sound as the actual sound source positions. On the other hand, the sound position setting unit 32 sets the reproduced content to the outside head of the head top as the sound source position after the 3D signal processing. The volume setting unit 31 sets the volume of the reproduced content to 0.5 times as the volume after the 3D signal processing. Consequently, the user can directly listen to the car sound while listening to the reproduced content from the head top like BGM.

Furthermore, for example, it is assumed a case where a sound element of the reproduced content and a sound element of an announcement sound of an external sound occur outside the home of the user wearing the headphones of the ear hole non-opening type. The sound position estimation unit 24 estimates the actual sound source position (inside head) of the reproduced content and the actual sound source position (outside head) of the announcement sound as the actual sound source positions. On the other hand, the sound position setting unit 32 sets the reproduced content to the outside head of the front surface and the sound source position of the announcement sound to the outside head of the head top as the sound source positions after the 3D signal processing. Consequently, the user can listen to the announcement sound while listening to the reproduced content from the head top like BGM.

Figure 12:
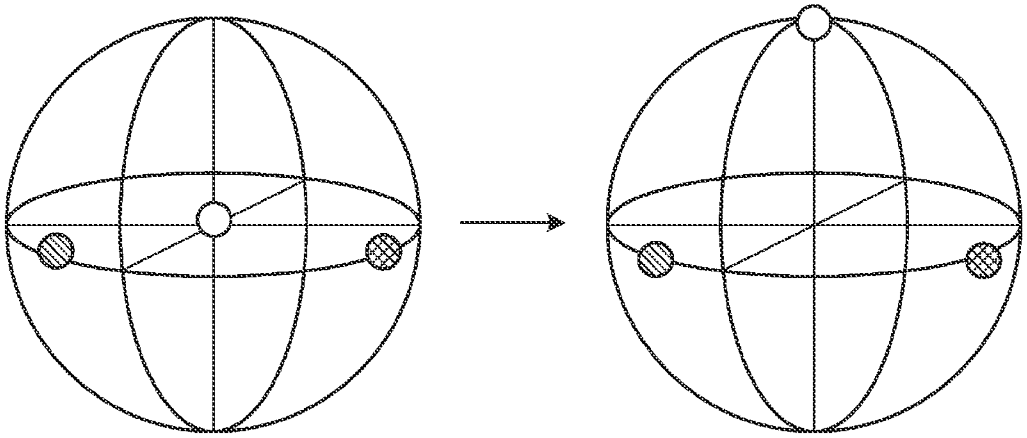
FIG. 12 is a diagram illustrating an example of the sound source positions of the sound element of the reproduced content, a sound element of Mr. A, and a sound element of Mr. B at the time of sound source position specification and the time of sound source position setting.

FIG. 12 is a diagram illustrating an example of the sound source positions of the sound element of the reproduced content, the sound element of Mr. A, and a sound element of Mr. B at the time of sound source position estimation and the time of sound source position setting. For example, it is assumed a case where the sound element of the reproduced content, the sound element of the voice of Mr. A, and the sound element of the voice of Mr. B occur at the home of the user wearing the headphones of the ear hole non-opening type. The sound position estimation unit 24 estimates, as the actual sound source positions, the sound source position (inside head) of the reproduced content, the actual sound source position (outside head) of the voice of Mr. A, and the actual sound source position (outside head) of the voice of Mr. B. On the other hand, the sound position setting unit 32 determines that the importance level of the voice of Mr. A is 1, the importance level of the reproduced content is 2, and the importance level of the voice of Mr. B is 3. The sound position setting unit 32 sets the reproduced content to the outside head of the head top and the voice of Mr. A to the actual sound source position (outside head) as the sound source positions after the 3D signal processing. Note that, since the sound element of the voice of Mr. B has the importance level 3, the sound element is canceled through the noise cancellation unit 33. Consequently, the user can listen to the voice of Mr. A while listening to the reproduced content from the head top like BGM.

For example, it is assumed a case where a sound element of the reproduced content, a sound element of the voice of Mr. A, and a sound element of the voice of Mr. B occur at the home of the user wearing the headphones of the ear hole opening type. The sound position estimation unit 24 estimates, as the actual sound source positions, the sound source position (inside head) of the reproduced content, the actual sound source position (outside head) of the voice of Mr. A, and the actual sound source position (outside head) of the voice of Mr. B. On the other hand, since the voice of Mr. A has the importance level 1, the reproduced content has the importance level 2, and the voice of Mr. B has the importance level 3, the sound position setting unit 32 sets the reproduced content to the outside head of the head top as the sound source position after the 3D signal processing. Consequently, the user can directly listen to the voice of Mr. A while listening to the reproduced content from the head top like BGM.

<4-4. Third 3D Signal Generating Process>

Figure 13:
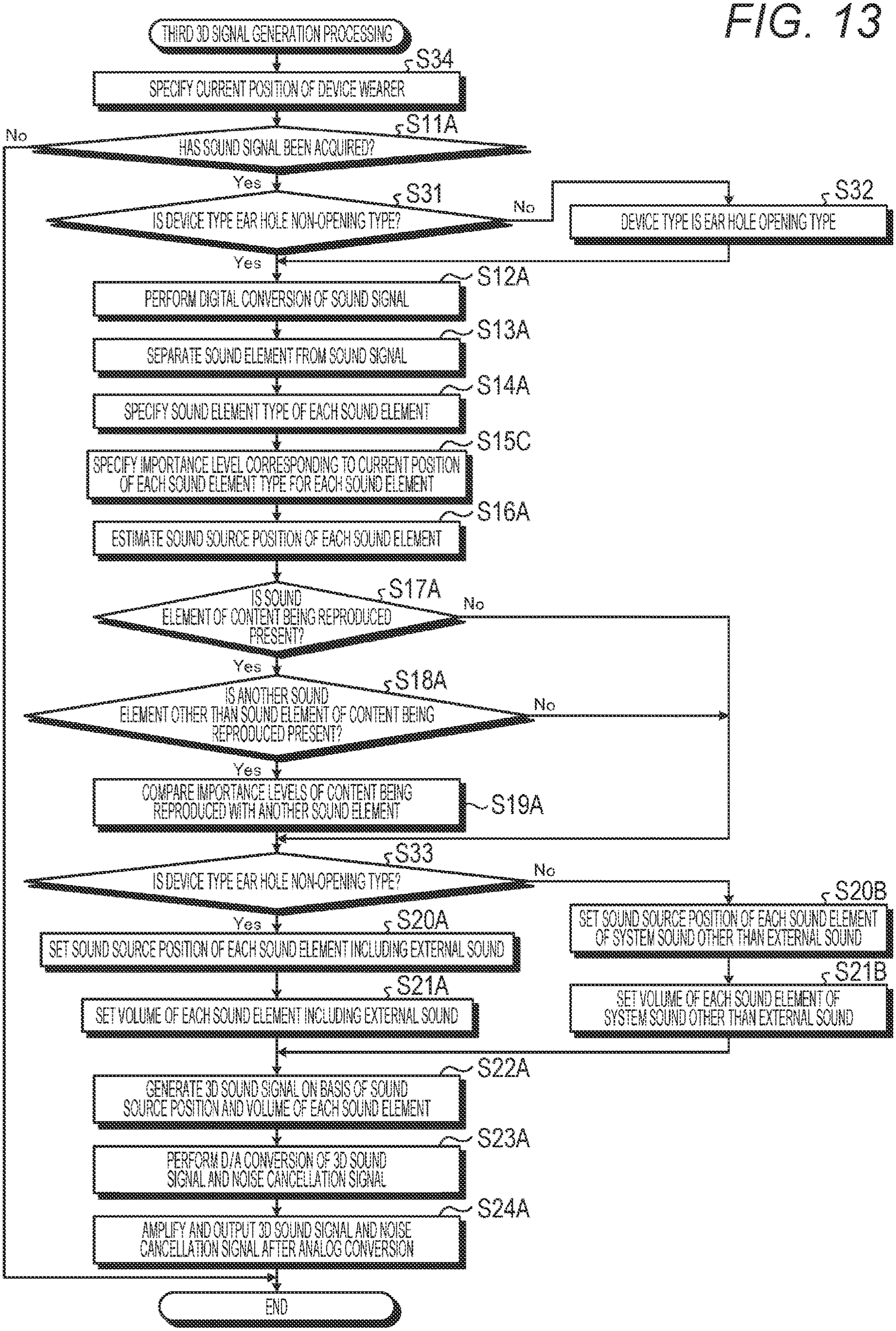
FIG. 13 is a flowchart illustrating an example of a processing operation of the information processing device according to a third 3D signal generating process.

FIG. 13 is a flowchart illustrating an example of a processing operation of the information processing device 2B according to a third 3D signal generating process of the third embodiment. In FIG. 13, the detection unit 15 in the information processing device 2B specifies the current position of the user wearing the sound output device 3 (step S32). Note that, for convenience of description, the case has been exemplified where the current position is the home of the user wearing the sound output device 3 or outside the home, but the current position is not limited thereto and can be appropriately changed. After specifying the current position of the user of the sound output device 3, the system sound acquisition unit 11 and the external sound acquisition unit 11A proceed to step S11A so as to determine whether or not a sound signal including the system sound and the external sound has been acquired.

The importance level specification unit 25 in the information processing device 2B specifies the sound element type of each sound element including the external sound in step S14A, and then refers to the importance level table 26B to specify the importance level corresponding to the current position for each sound element including the external sound and the system sound (step S15C). After specifying the importance level corresponding to the current position, the sound position estimation unit 24 in the information processing device 2B proceeds to step S16A so as to estimate the sound source position of each sound element including the system sound and the external sound.

In the information processing device 2B, in a case where the sound output device 3 of the user at home is the headphones of the ear hole opening type, the sound source position of the sound element of the system sound other than the external sound is adjusted according to the importance levels of the system sound corresponding to the home and the sound element of the external sound. Consequently, even in a case where the user wears the ear hole opening type headphones and is at home, the sound source position of the system sound can be adjusted so as not to disturb the external sound. That is, sound interference between a sound element in the system sound and another sound element in the external sound can be suppressed.

In the information processing device 2B, in a case where the sound output device 3 of the user at home is the headphones of the ear hole non-opening type, the sound source positions of the sound elements of the system sound and the external sound are adjusted according to the importance levels of the sound elements of the system sound and the external sound corresponding to the home. Consequently, even in a case where the user wears the headphones of the ear hole non-opening type and is at home, the sound source positions of the system sound and the external sound can be adjusted so as not to disturb the external sound. That is, sound interference between a sound element in the system sound and another sound element in the external sound can be suppressed.

In the information processing device 2B, in a case where the sound output device 3 of the user outside the home is the headphones of the ear hole opening type, the sound source position of the sound element of the system sound other than the external sound is adjusted according to the importance levels of the sound elements of the system sound and the external sound corresponding to outside the home. Consequently, even in a case where the user wears the headphones of the ear hole opening type and is outside the home, the sound source position of the system sound can be adjusted so as not to disturb the external sound. That is, sound interference between a sound element in the system sound and another sound element in the external sound can be suppressed.

In the information processing device 2B, in a case where the sound output device 3 of the user outside the home is the headphones of the ear hole non-opening type, the sound source positions of the sound elements of the system sound and the external sound are adjusted according to the importance levels of the sound elements of the system sound and the external sound corresponding to outside the home. Consequently, even in a case where the user wears the headphones of the ear hole non-opening type and is outside the home, the sound source positions of the system sound and the external sound can be adjusted so as not to disturb the external sound. That is, sound interference between a sound element in the system sound and another sound element in the external sound can be suppressed.

<4-5. Example of Operation of Information Processing Device>

Figure 14:
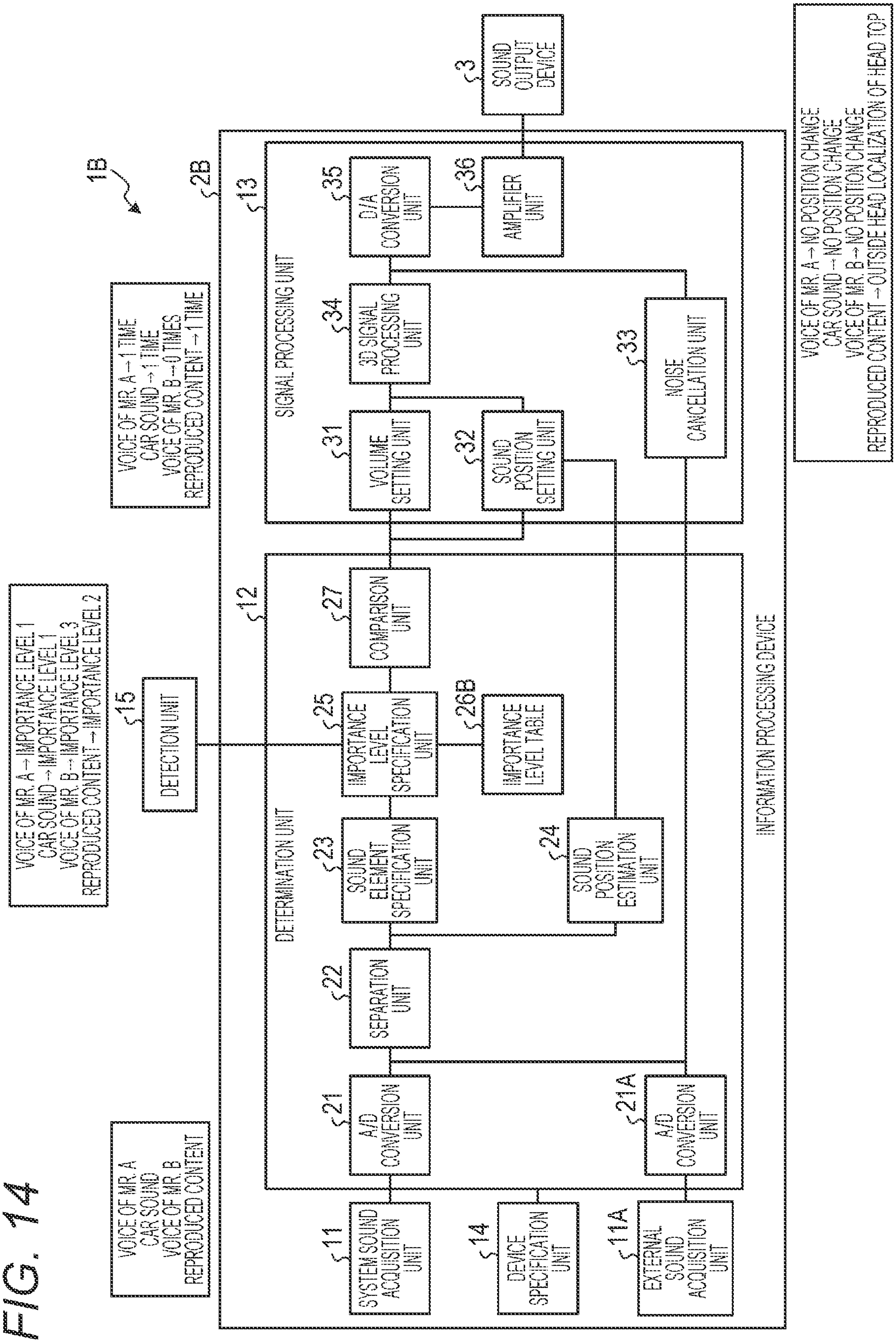
FIG. 14 is a diagram illustrating an example of an operation of the information processing device.

FIG. 14 is a diagram illustrating an example of an operation of the information processing device 2B. It is assumed a case where the user wears the headphones of the ear hole non-opening type outside the home and, for example, the voice of Mr. A, the car sound, the voice of Mr. B, and the reproduced content occur. Moreover, the sound output device 3 worn by the user is the headphones of the ear hole non-opening type. The system sound acquisition unit 11 and the external sound acquisition unit 11A acquire a sound signal including the voice of Mr. A, the car sound, the voice of Mr. B, the reproduced content, and the like. Note that the external sound acquisition unit 11A acquires, for example, the external sounds such as the voice of Mr. A, the car sound, and the voice of Mr. B with a microphone that is not illustrated.

The A/D conversion unit 21 performs digital conversion of the sound signal acquired by the system sound acquisition unit 11 and outputs the sound signal after digital conversion to the separation unit 22. The A/D conversion unit 21A performs digital conversion of the sound signal of the external sound acquired by the external sound acquisition unit 11A, and outputs the sound signal after digital conversion to the separation unit 22. The separation unit 22 separates, for example, a sound element of the voice of Mr. A, a sound element of the car sound, a sound element of the voice of Mr. B, and a sound element of the reproduced content from the sound signal by the frequency analysis or the like or the sound source separation technique or the like. The sound element specification unit 23 specifies a sound element type of each separated sound element. Moreover, the detection unit 15 determines that the current position of the user wearing the sound output device 3 is outside the home. The importance level specification unit 25 refers to the importance level table 26B and specifies the importance level of each sound element outside the home. The importance level specification unit 25 determines the importance levels of the voice of Mr. A and the car sound as the importance level 1, the importance level of the voice of Mr. B as the importance level 3, and the importance level of the reproduced content as the importance level 2.

Furthermore, the sound position estimation unit 24 estimates the sound source position of each separated sound element. The sound position estimation unit 24 estimates, for example, the actual sound source position of the voice of Mr. A (for example, front surface) and the actual sound source position of the car sound (for example, right side surface) as the actual sound source positions. Moreover, the sound position estimation unit 24 estimates an actual sound source position (for example, left side surface) of the voice of Mr. B and an actual sound source position (inside head) of the reproduced content as the actual sound source positions.

The sound position setting unit 32 sets the sound source position after the 3D signal processing of each sound element according to the importance level of each sound element. As the sound source positions after the 3D signal processing, for example, the sound position setting unit 32 sets the voice of Mr. A to an actual sound source position (outside head of the front surface) and the car sound to an actual sound source position (for example, outside head of the right side surface). Moreover, as the sound source position after the 3D signal processing, the sound position setting unit 32 sets the actual sound source position (for example, outside head of the left side surface) of the voice of Mr. B and the reproduced content to the outside head of the head top.

The volume setting unit 31 sets the volume after the 3D signal processing of each sound element according to the importance level of each sound element. As the volumes after the 3D signal processing, the volume setting unit 31 sets, for example, the volume of the voice of Mr. A to 1 time, the volume of the car sound to 1 time, the volume of the voice of Mr. B to 0 times, and the volume of the reproduced content to 1 time. The 3D signal processing unit 34 generates a 3D sound signal of each sound element on the basis of the volume and the sound source position of each sound element after the 3D signal processing. The 3D signal processing unit 34 synthesizes the 3D sound signal of each sound element and outputs the synthesized 3D sound signal to the D/A conversion unit 35. Then, the D/A conversion unit 35 performs analog conversion of the 3D sound signal and the noise cancellation signal processed by the noise cancellation unit 33, and acoustically outputs the 3D sound signal and the noise cancellation signal after analog conversion to the sound output device 3. Consequently, the user wearing the sound output device 3 can listen to the voice of Mr. A and the car sound from the actual sound source position without listening to the voice of Mr. B while listening to the reproduced content flowing from the head top like BGM.

5. Modification Example

As the information processing device 2, the information processing device such as a virtual assistant connected to the sound output device 3 has been exemplified. However, the information processing device is not limited to the virtual assistant, and can be applied to, for example, a content reproduction device or a smartphone having a function of reproducing a reproduced content or a function of acquiring another sound element, and can be appropriately changed.

Furthermore, the information processing device 2 may be, for example, a server device on a cloud, and may execute processing of the determination unit 12 and the signal processing unit 13 on the cloud and transmit the 3D sound signal generated by the signal processing unit 13 to the sound output device 3. Furthermore, the determination unit 12 and the signal processing unit 13 may be incorporated in the sound output device 3.

The sound output device 3 may be, for example, headphones for a head mounted display and the like of virtual reality (VR), augmented reality (AR), or the like, and can be appropriately changed.

In the information processing device 2, the case has been exemplified where the sound source position of the sound element is changed according to the importance level of the sound element, but acoustic characteristics of the sound element may be adjusted in addition to the change of the sound source position of the sound element.

In the information processing device 2, the case has been exemplified where the sound source position of the sound element is changed according to the importance level and the volume at the changed sound source position is adjusted. However, instead of adjusting the volume, the frequency characteristic of the sound element may be adjusted such that the sound element having a high importance level is easy to hear.

In the information processing device 2, the cases have been exemplified where the current position of the user wearing the sound output device 3 is at home or outside the home, and where the importance level of each sound element corresponding to the current position is defined. However, it is not limited to the home or outside the home, and for example, the importance level of each sound element corresponding to a place such as a company or a train may be defined.

Furthermore, the information processing device 2 is not limited to the current position or the like of the user wearing the sound output device 3, and the importance level of each sound element may be defined in association with the time zone of the user or the state of the user, for example, a state in which the user is studying, sleeping, or the like. For example, in a case where the user is studying, the reproduced content may be changed from the inside head to the outside head of the head top. Furthermore, in a case where the user is undergoing dental treatment, the content being reproduced may be changed from the inside head to the outside head of the head top, a sound element of ringing sound of a treatment device may be acquired, and the ringing sound of the treatment device may be canceled by sound of an opposite phase.

Furthermore, in the information processing device 2, the case has been exemplified where the sound source position of the sound element of the reproduced content is changed from the inside head to the outside head of the head top according to the importance level of the sound element, and the volume of the sound image at the sound source position is adjusted. However, in the reproduced content, the voice of a lyrics portion may be removed, and only the sound of an accompaniment portion may be output.

Furthermore, in the information processing device 2, it is assumed a case where the sound element of the reproduced content is higher than the importance level of the sound element of a first notification sound, and the sound element of the reproduced content is lower than the importance level of the sound element of a second notification sound. In this case, the information processing device 2 may change the first notification sound to the outside head of the head top and the second notification sound to the outside head of the front surface or back surface.

Furthermore, in the information processing device 2, the case has been exemplified where the importance level of the sound element of the voice of Mr. A is defined in advance in the importance level table 26A. However, for example, a person having high relevance with the user may be specified according to the social graph of the SNS, and the definition in the importance level table 26A may be updated so that the importance level of the sound element of the specified person becomes high.

Furthermore, the information processing device 2 may have a function of detecting a reaction motion such as facing the direction of sound of the user in a case where a sound element occurs, and may change the importance level of each sound element in the importance level table 26 according to a combination of the sound element and the state of the user according to the reaction motion of the user.

Furthermore, in the information processing device 2, for example, the case has been exemplified where the importance level of the sound element of the car sound is set to the importance level 1 in the case of outside the home. However, even in the case of outside the home, for example, the risk with respect to the car is low in a place where the vehicle does not pass, such as a pedestrian bridge, and thus the importance level may be changed according to the place. Furthermore, even in the case of outside the home, in the case of an accident frequent area, the volume of the sound element of a car may be increased to alert the user to the presence of the car.

In the information processing device 2, the frequency of the car sound may be adjusted simultaneously with the volume of the car sound to make it easier for the user to hear the sound of the car, or a specific sound may be added to make it easier for the user to recognize the presence of the car.

In the information processing device 2, a notification sound for notifying a green light, a red light, or the like of a crosswalk or the like may vary depending on the region. However, in a case where the information processing device 2 detects the notification sound of the crosswalk, the information processing device 2 may replace the notification sound with another notification sound of a region known by the user.

The case has been exemplified where the information processing device 2 outputs the 3D sound signal in which the sound source position of each sound element is appropriately changed according to the importance level of each sound element to the sound output device 3. However, the sound output device is not limited to the sound output device 3, and the sound source position may be changed using a plurality of speakers.

The information processing device 2 of the present embodiment may be implemented by a dedicated computer system or a general-purpose computer system.

For example, a program for executing the above-described operation (for example, the first 3D signal generating process, the second 3D signal generating process, and the third 3D signal generating process) is stored in a computer-readable recording medium such as an optical disk, a semiconductor memory, a magnetic tape, or a flexible disk and distributed. Then, for example, the program is installed in a computer and the above-described processing is executed, to thereby configure the information processing device 2 (2A, 2B).

Furthermore, the program described above may be stored in a storage device included in another information processing device on a network such as the Internet so that download of the program to a computer or the like is possible. Furthermore, the above-described functions may be implemented by cooperation of an operating system (OS) and application software. In this case, a portion other than the OS may be stored in a medium and distributed, or a portion other than the OS may be stored in a server device so that download to a computer or the like is possible.

Furthermore, among the respective processes described in the above-described embodiments, all or a part of the processes described as being performed automatically can be performed manually, or all or a part of the processes described as being performed manually can be performed automatically by a known method. In addition, information including the processing procedures, the specific names, and the various data and parameters illustrated in the document and the drawings described above can be arbitrarily changed unless otherwise specified. For example, the various types of information illustrated in the drawings are not limited to the illustrated information. Furthermore, in the above-described embodiments, there is a portion where a specific value is illustrated and described, but the value is not limited to the example, and another value may be used.

Furthermore, each component of each device illustrated in the drawings is functionally conceptual, and is not necessarily physically configured as illustrated. That is, a specific form of distribution and integration of each device is not limited to the illustrated form, and all or a part thereof can be configured in a functionally or physically distributed and integrated manner in an arbitrary unit according to various loads, usage conditions, and the like.

Furthermore, the above-described embodiments can be appropriately combined in a region in which the processing contents do not contradict each other. Furthermore, the order of each step illustrated in the flowcharts and the sequence diagrams of the above-described embodiments can be changed as appropriate.

Furthermore, for example, the present embodiment can be implemented as any component that constitutes a device or a system, for example, a processor as system large scale integration (LSI) or the like, a module using a plurality of processors or the like, a unit using a plurality of modules or the like, a set obtained by further adding other functions to the unit, and the like (that is, a configuration of a part of the device).

Note that, in the present embodiment, the system means a set of a plurality of components (devices, modules (parts), and the like), and it does not matter whether or not all the components are in the same housing. Therefore, both of a plurality of devices housed in separate housings and connected via a network and a single device in which a plurality of modules is housed in one housing are systems.

Furthermore, the present embodiment can employ, for example, a configuration of cloud computing in which at least one function (for example, the determination unit 12 or the signal processing unit 13) is shared and processed in cooperation by a plurality of devices via a network.

6. Conclusion

As described above, an information processing device according to an embodiment of the present disclosure includes an acquisition unit that acquires a sound element of a content being reproduced and one or a plurality of other sound elements, a determination unit that determines importance levels of the sound elements acquired by the acquisition unit, and a signal processing unit that changes a sound source position of either the sound element of the content being reproduced or another sound element according to the importance levels of the sound elements. Consequently, sound interference between sound elements can be suppressed by changing the sound source position of each sound element according to the importance level of the sound element without interrupting the content being reproduced. Then, the user can easily hear the another sound element while listening to the reproduced content.

In a case where an importance level of the another sound element is higher than an importance level of the sound element of the content being reproduced, the information processing device changes the sound source position of the sound element of the content being reproduced. Consequently, sound interference between the sound element of the content being reproduced and the another sound element can be suppressed. Then, the user can easily hear the another sound element while listening to the reproduced content.

In a case where an importance level of the another sound element is higher than an importance level of the sound element of the content being reproduced, the information processing device changes the sound source position of the sound element of the content being reproduced to a sound source position different from the sound source position of the another sound element. Consequently, sound interference between the sound element of the content being reproduced and the another sound element can be suppressed. Then, the user can easily hear the another sound element while listening to the reproduced content.

In a case where an importance level of the another sound element is higher than an importance level of the sound element of the content being reproduced, the information processing device changes the sound source position of the sound source of the sound element of the content being reproduced to outside head localization in a sound output device. Consequently, sound interference between the sound element of the content being reproduced and the another sound element can be suppressed. Then, the user can easily hear the another sound element while listening to the reproduced content.

In a case where an importance level of the sound element of the content being reproduced is higher than the importance level of the other sound elements, the information processing device changes to outside head localization in the sound output device in which the sound source position of the sound element of the content being reproduced and the sound source position of the another sound element are different. Consequently, sound interference between the sound element of the content being reproduced and the another sound element can be suppressed. Then, the user can easily hear the another sound element while listening to the reproduced content.

In a case where a movement of the user who uses the sound output device to a predetermined space is detected, the information processing device refers to an importance level table that manages the importance level of each sound element in each space corresponding to the predetermined space, and determines the importance level of an acquired sound element. The predetermined space can be, for example, the user's home or various environments outside the home. Furthermore, the movement to the predetermined space can mean, for example, when the user moves from inside to outside the home, or when the user moves from outside to inside the home, the user moves from one space outside the home to another space. Consequently, it is possible to suppress sound interference between sound elements according to an importance level in each predetermined space by changing the importance level of the sound element in each predetermined space in which the user using the sound output device moves.

The information processing device refers to the importance level table and determines the importance level of each separated sound element. Consequently, sound interference between sound elements can be suppressed by changing the importance level of each sound element.

The information processing device refers to the importance level table that manages an importance level of each sound element including a sound element of a specific person and the importance level table, emphasizes another sound element of the specific person in a case where the importance level of the sound element of the specific person specified from the separated another sound element is higher than a sound element of the content being reproduced, and cancels the another sound element of the specific person in a case where an importance level of the another sound element of the specified specific person is not higher than the sound element of the content being reproduced. Consequently, in a case where there is a voice of a specific person higher than the importance level of the reproduced content, the sound element of the specific person is prioritized, and in a case where there is a voice of a person other than the specific person not higher than the importance level of the reproduced content, sound interference with the voice of the specific person can be suppressed by canceling the voice.

The information processing device updates the importance level of each sound element including the sound element of the specific person such that the importance level of the sound element of the specific person increases according to a relevance between the user of the sound output device and the specific person. Consequently, the importance level of each sound element of the specific person can be updated according to the relevance between the user and the specific person.

In the importance level table, the importance level may be appropriately updated in one importance level table, or a plurality of importance level tables may be stored in advance in a cloud, a database, or the like, and a predetermined importance level table may be appropriately referred to from a plurality of importance level tables at a timing when the importance level is changed, or both patterns may be appropriately combined.

An information processing device acquires a sound element emitted by an information processing device and another sound element outside the information processing device including a sound element of an external sound captured from the outside of the information processing device, and allows, in a case where a sound output device that outputs the sound element to a sound source position is a headphone of an ear hole opening type, changing the sound source position of the sound element according to the importance level of the sound element emitted by the information processing device. Furthermore, in a case where the sound output device is the headphones of the ear hole non-opening type, the information processing device allows changing the sound source positions of the sound element according to the importance level of the sound element emitted by the information processing device and the importance level of the sound element of the external sound. Consequently, in a case where the user wears the headphones of the ear hole opening type, the sound source position of the sound element emitted by the information processing device can be changed according to the importance level of the sound element, and in a case where the user wears the ear hole non-opening type headphones, the sound source positions of the sound element emitted by the information processing device and the sound element of the external sound can be changed according to the importance level of the sound element.

Although the embodiments of the present disclosure have been described above, the technical scope of the present disclosure is not limited to the above-described embodiments as it is, and various modifications can be made without departing from the gist of the present disclosure. Furthermore, components of different embodiments and modification examples may be appropriately combined.

Furthermore, the effects of the embodiments described herein are merely examples and are not limited, and other effects may be provided.

Note that the present technology can have configurations as follows.

(1)

An information processing device including:

an acquisition unit that acquires one or a plurality of sound elements;

a determination unit that determines importance levels of the sound elements acquired by the acquisition unit; and a signal processing unit that changes a sound source position of at least one of a sound element of a content being reproduced or another sound element according to the importance levels of the sound elements determined by the determination unit.

(2)

The information processing device according to (1) above, in which the one or the plurality of sound elements includes at least a content being reproduced.

(3)

The information processing device according to (1) or (2) above, in which the signal processing unit changes, in a case where an importance level of the another sound element is higher than an importance level of the sound element of the content being reproduced, the sound source position of the sound element of the content being reproduced.

(4)

The information processing device according to any one of (1) to (3) above, in which the signal processing unit changes, in a case where an importance level of the another sound element is higher than an importance level of the sound element of the content being reproduced, the sound source position of the sound element of the content being reproduced to a sound source position different from the sound source position of the another sound element.

(5)

The information processing device according to any one of (1) to (4) above, in which the signal processing unit changes, in a case where an importance level of the another sound element is higher than an importance level of the sound element of the content being reproduced, the sound source position of the sound element of the content being reproduced to an outside head by using a head-related transfer function.

(6)

The information processing device according to any one of (1) to (4) above, in which the signal processing unit changes, in a case where an importance level of the sound element of the content being reproduced is higher than an importance level of the another sound element, the sound source position of the sound element of the content being reproduced and the sound source position of the another sound element by using a head-related transfer function to be different from each other.

(7)

The information processing device according to any one of (1) to (6) above, further including a sound output device that localizes and outputs the sound element to a sound source position, in which the determination unit determines an importance level of each of the sound elements with reference to an importance level table assigned to each type of the sound elements.

(8)

The information processing device according to any one of (1) to (7) above, in which the importance level table updates the importance level of the sound element according to a predetermined space in which a user wearing the sound output device is present.

(9)

The information processing device according to any one of (1) to (8) above, in which in a case where movement of the user wearing the sound output device from a first predetermined space to a second predetermined space is detected, the importance level table is updated with an importance level definition of the sound elements.

(10)

The information processing device according to any one of (1) to (9) above, in which the importance level table updates the importance level of the sound element according to relevance between a user wearing the sound output device and a specific person.

(11)

The information processing device according to (1) above, further including a cancellation unit that emphasizes, in a case where an importance level of a sound element of a specific person specified from the another sound element is higher than a sound element of the content being reproduced, another sound element of the specific person, and cancels, in a case where an importance level of another sound element of the specific person specified is not higher than the sound element of the content being reproduced, the another sound element of the specific person.

(12)

The information processing device according to any one of (1) to (11) above, in which the acquisition unit acquires a sound element emitted by the information processing device including a sound element of the content being reproduced, and another sound element outside the information processing device including a sound element of an external sound captured from an outside of the information processing device, and the signal processing unit allows, in a case where a sound output device that outputs the sound element to a sound source position is a headphone of an ear hole opening type, changing a sound source position of the sound element emitted by the information processing device according to an importance level of the sound element, and allows, in a case where the sound output device is a headphone of an ear hole non-opening type, changing sound source positions of the sound element emitted by the information processing device and the sound element of the external sound according to the importance level of the sound element.

(13)

The information processing device according to any one of (1) to (12) above, further including a separation unit that separates the sound element acquired by the acquisition unit.

(14)

An information processing method including:

acquiring one or a plurality of other sound elements;

determining importance levels of the sound elements acquired; and changing a sound source position of at least one of a sound element of a content being reproduced or the other sound elements according to the importance levels of the sound elements determined.

(15)

An information processing program causing a computer to execute processing including:

acquiring one or a plurality of other sound elements;

determining importance levels of the sound elements acquired; and changing a sound source position of at least one of a sound element of a content being reproduced or the other sound elements according to the importance levels of the sound elements determined.

(16)

An information processing system including an information processing device that acquires one or a plurality of other sound elements and a sound output device that outputs the sound element acquired in the image processing device to a sound source position, in which the information processing device includes a determination unit that determines importance levels of the sound elements, and a signal processing unit that changes a sound source position of at least one of a sound element of a content being reproduced or the other sound elements in the sound output device according to the importance levels of the sound elements determined by the determination unit.

REFERENCE SIGNS LIST

1 Information processing system
2, 2A, 2B Information processing device
3 Headphone
11 Acquisition unit
12 Determination unit
13 Signal processing unit
14 Device specification unit
15 Detection unit
25 Importance level specification unit
26, 26A, 26B Importance level table
31 Volume setting unit
32 Sound position setting unit
34 3D signal processing unit

The invention claimed is:

1. An information processing device, comprising:

an acquisition unit configured to acquire one or a plurality of sound elements, wherein the plurality of sound elements comprises a first sound element and a second sound element:

a determination unit configured to determine importance levels of the acquired plurality of sound elements; and a signal processing unit configured to change, based on the determined importance levels of the plurality of sound elements, a sound source position of at least one of the first sound element of content that is reproduced or the second sound element.

2. The information processing device according to claim 1, wherein the one or the plurality of sound elements includes at least the content that is reproduced.

3. The information processing device according to claim 1, wherein the signal processing unit is further configured to:

change, in a case where an importance level of the second sound element is higher than an importance level of the first sound element, the sound source position of the first sound element of the content that is reproduced.

4. The information processing device according to claim 1, wherein the signal processing unit is configured to:

change, in a case where an importance level of the second sound element is higher than an importance level of the first sound element, the sound source position of the first sound element of the content that is reproduced to a sound source position different from the sound source position of the second sound element.

5. The information processing device according to claim 1, wherein the signal processing unit is further configured to change, in a case where an importance level of the second sound element is higher than an importance level of the first sound element, the sound source position of the first sound element that is reproduced to an outside a head by using a head-related transfer function.

6. The information processing device according to claim 1, wherein the signal processing unit is further configured to change, in a case where an importance level of the first sound element is higher than an importance level of the second sound element, the sound source position of the first sound element that is reproduced and the sound source position of the second sound element by using a head-related transfer function to be different from each other.

7. The information processing device according to claim 1, further comprising a sound output device configured to:

localize the first sound element to the sound source position; and output the localized first sound element, wherein the determination unit is further configured to determine an importance level of each of the plurality of sound elements with reference to an importance level table.

8. The information processing device according to claim 7, wherein the importance level table updates an importance level of the first sound element of the plurality of sound elements, based on a specific space in which a user wearing the sound output device is present.

9. The information processing device according to claim 7, wherein in a case where movement of a user wearing the sound output device from a first space to a second space is detected, the importance level table is updated with an importance level definition of each of the plurality of sound elements.

10. The information processing device according to claim 7, wherein the importance level table updates the importance level of the first sound element based on a relevance between a user wearing the sound output device and a specific person.

11. The information processing device according to claim 1, further comprising a cancellation unit configured to:

emphasize, in a case where an importance level of a third sound element of a specific person specified from the second sound element is higher than the first sound element of the content, the third sound element of the specific person, and cancel, in a case where an importance level of a fourth sound element of the specific person specified is not higher than the third sound element, the fourth sound element of the specific person.

12. The information processing device according to claim 1, wherein the plurality of sound elements includes a third sound element emitted by the information processing device and a fourth sound element outside the information processing device, the third sound element includes the first sound element of the content, and the fourth sound element includes an external sound captured from an outside of the information processing device, and the signal processing unit is further configured to:

change, in a case where a sound output device that outputs the third sound element is a headphone of an ear hole opening type, a sound source position of the third sound element emitted by the information processing device, based on an importance level of the third sound element, or change, in a case where the sound output device is a headphone of an ear hole non-opening type, sound source positions of the third sound element emitted by the information processing device and the fourth sound element of the external sound, based on the importance level of the plurality of sound elements.

13. The information processing device according to claim 1, further comprising a separation unit configured to separate the first sound element acquired by the acquisition unit.

14. An information processing method, comprising:

acquiring one or a plurality of sound elements, wherein the plurality of sound elements comprises a first sound element and a second sound element:

determining importance levels of the acquired plurality of sound elements; and changing, based on the determined importance levels of the plurality of sound elements, a sound source position of at least one of the first sound element of content that is reproduced or the second sound element.

15. A non-transitory computer-readable medium having stored thereon computer-executable instructions, that when executed by a processor of an information processing apparatus, cause the processor to execute operations, the operations comprising:

acquiring one or a plurality of sound elements, wherein the plurality of sound elements comprises a first sound element and a second sound element;

determining importance levels of the acquired plurality of sound elements; and changing, based on the determined importance levels of the plurality of sound elements, a sound source position of at least one of the first sound element of content that is reproduced or the second sound element.

16. An information processing system, comprising:

an information processing device configured to acquire one or a plurality of sound elements, wherein the plurality of sound elements comprises a first sound element and a second sound element; and a sound output device configured to output a sound element, of the plurality of sound elements, to a sound source position, wherein the information processing device includes:

a determination unit configured to determine importance levels of the acquired plurality of sound elements; and a signal processing unit configured to change, based on the determined importance levels of the plurality of sound elements, a sound source position of at least one of the first sound element of content that is reproduced or the second sound element in the sound output device.

* * * * *